US010856123B2

(12) United States Patent
O'Brien

(10) Patent No.: US 10,856,123 B2
(45) Date of Patent: Dec. 1, 2020

(54) CONTENT MANAGEMENT AND PRESENTATION SYSTEMS AND METHODS

(71) Applicant: THE SSCG GROUP, LLC, New York, NY (US)

(72) Inventor: Lee O'Brien, New York, NY (US)

(73) Assignee: THE SSCG GROUP, LLC, New York, NY (US)

(*) Notice: Subject to any disclaimer, the term of this patent is extended or adjusted under 35 U.S.C. 154(b) by 355 days.

(21) Appl. No.: 14/835,476

(22) Filed: Aug. 25, 2015

(65) Prior Publication Data
US 2016/0057184 A1 Feb. 25, 2016

Related U.S. Application Data

(60) Provisional application No. 62/041,585, filed on Aug. 25, 2014.

(51) Int. Cl.
*H04W 4/80* (2018.01)
*H04L 29/08* (2006.01)
(Continued)

(52) U.S. Cl.
CPC .............. *H04W 4/80* (2018.02); *H04L 12/18* (2013.01); *H04L 12/1813* (2013.01);
(Continued)

(58) Field of Classification Search
CPC ...... H04W 4/80; H04W 92/18; H04L 67/025; H04L 67/141; H04L 67/06; H04L 12/18; H04L 12/1813; H04L 29/06176
See application file for complete search history.

(56) References Cited

U.S. PATENT DOCUMENTS 6,108,687 A 8/2000 Craig
7,383,495 B2 6/2008 Dontcheva et al.
(Continued)

FOREIGN PATENT DOCUMENTS

EP 1574971 A1 9/2005
JP 2013-025608 A 2/2013
WO WO 2010/025476 A1 2/2012

OTHER PUBLICATIONS

Morelock, Joseph. "Quick Tip: Using Idea Flight to Present to Small Groups". Aug. 15, 2013. pp. 1-4. http://wiki.canby.k12.or.us/groups/ipodusergroup/wiki/aecb3/Quick_Tip_Using_Idea_Flight_to_Present_to_Small_Groups.html (date accessed: Oct. 1, 2017).*
(Continued)

*Primary Examiner* — Patrice L Winder
*Assistant Examiner* — Angela M Widhalm De Rodrig
(74) *Attorney, Agent, or Firm* — Winston & Strawn LLP

(57) ABSTRACT

A mobile software application and system is provided that allows two viewers on two different electronic tablets such as but not limited to iPads to view the same content on both iPads. The system allows two viewers on the two different electronic tablets to co-navigate a presentation in order to allow a product representative, or any user serving as the "Master or Presenter" to present information about a product in a simultaneous working cooperation in the software application with the recipient of the information, "Slave or Listener." The system having the two portable tablets loaded with a resident software application is operating over the operating system of each tablet, wherein the resident software application is installed on both of the two tablets to provide a dedicated marketing application for sales representatives of a corresponding industry or the like. Method of using the software application and system is also contemplated herein.

24 Claims, 17 Drawing Sheets

(51) Int. Cl.
  *H04L 12/18* (2006.01)
  *H04L 29/06* (2006.01)
  *H04W 92/18* (2009.01)

(52) U.S. Cl.
  CPC ...... *H04L 29/06176* (2013.01); *H04L 67/025* (2013.01); *H04L 67/06* (2013.01); *H04L 67/141* (2013.01); *H04W 92/18* (2013.01)

(56) References Cited

U.S. PATENT DOCUMENTS

| | | | |
|---|---|---|---|
| 7,480,624 B2 | 1/2009 | Roman et al. | |
| 7,508,354 B1 | 3/2009 | Sanders et al. | |
| 7,634,533 B2* | 12/2009 | Rudolph | H04L 12/1827 709/203 |
| 7,640,502 B2* | 12/2009 | Xu | G06F 3/0481 715/730 |
| 7,751,347 B2* | 7/2010 | Giroti | H04L 12/1822 370/260 |
| 7,925,698 B2 | 4/2011 | Caspi et al. | |
| 8,046,424 B2* | 10/2011 | Novik | G06F 16/1787 709/216 |
| 8,131,672 B2 | 3/2012 | Hind et al. | |
| 8,151,179 B1 | 4/2012 | Raman et al. | |
| 8,195,768 B2 | 6/2012 | Vaughan et al. | |
| 8,224,999 B2 | 7/2012 | Suryanarayana | |
| 8,225,191 B1 | 7/2012 | Kalman | |
| 8,238,696 B2* | 8/2012 | Dart | G06F 16/50 382/305 |
| 8,443,040 B2 | 5/2013 | Schauser et al. | |
| 8,473,571 B2 | 6/2013 | Penner et al. | |
| 8,954,520 B2* | 2/2015 | Triantos | G06Q 10/103 709/205 |
| 8,997,156 B2* | 3/2015 | Newell | H04N 7/17318 725/24 |
| 9,398,059 B2* | 7/2016 | Shepherd | H04L 65/403 |
| 9,477,380 B2* | 10/2016 | Amijee | G06F 3/0482 |
| 9,584,682 B2* | 2/2017 | Earnshaw | H04N 1/00347 |
| 9,749,373 B2* | 8/2017 | Dave | H04L 65/4084 |
| 2002/0065683 A1 | 5/2002 | Pham et al. | |
| 2004/0255232 A1 | 12/2004 | Hammond et al. | |
| 2006/0023969 A1* | 2/2006 | Lara | H04N 1/3333 382/309 |
| 2006/0041686 A1* | 2/2006 | Caspi | G06Q 10/10 709/248 |
| 2006/0107195 A1* | 5/2006 | Ramaswamy | H04N 21/435 715/203 |
| 2006/0271398 A1 | 11/2006 | Belcastro | |
| 2007/0100697 A1 | 5/2007 | Kolla | |
| 2007/0260634 A1 | 11/2007 | Makela et al. | |
| 2008/0126179 A1* | 5/2008 | Norfolk | G06Q 10/107 705/7.32 |
| 2009/0063945 A1 | 3/2009 | Bhogal et al. | |
| 2009/0164581 A1 | 6/2009 | Bove et al. | |
| 2009/0171791 A1 | 7/2009 | Shariff | |
| 2009/0249222 A1 | 10/2009 | Schmidt et al. | |
| 2009/0265487 A1* | 10/2009 | Zhang | G06Q 10/10 710/61 |
| 2009/0318168 A1* | 12/2009 | Khosravy | G01C 21/00 455/456.3 |
| 2010/0058410 A1 | 3/2010 | Rance et al. | |
| 2010/0146078 A1* | 6/2010 | Wolff | H04L 12/1822 709/219 |
| 2010/0153577 A1* | 6/2010 | Wohlert | H04N 7/17318 709/231 |
| 2010/0218099 A1 | 8/2010 | van Melle et al. | |
| 2011/0016170 A1 | 1/2011 | Gouesbert et al. | |
| 2011/0107221 A1 | 5/2011 | Kenna et al. | |
| 2011/0228463 A1 | 9/2011 | Matagne | |
| 2011/0289155 A1 | 11/2011 | Pirnazar | |
| 2011/0307788 A1 | 12/2011 | Cheung et al. | |
| 2012/0089928 A1 | 4/2012 | Bryant et al. | |
| 2012/0159403 A1 | 6/2012 | Capan | |
| 2012/0192084 A1 | 7/2012 | Dura et al. | |
| 2012/0197998 A1* | 8/2012 | Kessel | G06Q 10/10 709/205 |
| 2013/0007103 A1 | 1/2013 | Braun et al. | |
| 2013/0073965 A1 | 3/2013 | Sik et al. | |
| 2013/0080560 A1 | 3/2013 | Sayankar et al. | |
| 2013/0083068 A1 | 4/2013 | Lethers et al. | |
| 2013/0110937 A1 | 5/2013 | Burns et al. | |
| 2013/0110941 A1 | 5/2013 | Lewis et al. | |
| 2013/0124664 A1 | 5/2013 | Fonseca, Jr. et al. | |
| 2013/0138424 A1* | 5/2013 | Koenig | G10L 21/00 704/9 |
| 2013/0156093 A1 | 6/2013 | Vonog et al. | |
| 2013/0182063 A1 | 7/2013 | Jaiswal et al. | |
| 2013/0311947 A1 | 11/2013 | Tsai et al. | |
| 2013/0346482 A1 | 12/2013 | Holmes | |
| 2014/0006500 A1 | 1/2014 | van Rijkom et al. | |
| 2014/0006915 A1 | 1/2014 | Bank et al. | |
| 2014/0019858 A1 | 1/2014 | McAllister et al. | |
| 2014/0052872 A1* | 2/2014 | Varoglu | H04L 65/80 709/231 |
| 2014/0053085 A1 | 2/2014 | Stephure et al. | |
| 2014/0067950 A1 | 3/2014 | Winograd | |
| 2014/0068415 A1 | 3/2014 | Halevi et al. | |
| 2014/0068431 A1 | 3/2014 | Powers et al. | |
| 2014/0088393 A1 | 3/2014 | Bernstein et al. | |
| 2014/0095436 A1* | 4/2014 | Ryder | G06F 17/30575 707/624 |
| 2014/0103104 A1* | 4/2014 | Jover | H04N 21/41407 235/375 |
| 2014/0129944 A1 | 5/2014 | Bhogal et al. | |
| 2014/0282013 A1* | 9/2014 | Amijee | G06F 3/0482 715/732 |
| 2015/0173472 A1* | 6/2015 | Gierke | A45C 5/14 190/18 A |
| 2015/0181020 A1* | 6/2015 | Fitzsimmons | H04M 3/42221 379/67.1 |
| 2016/0057184 A1* | 2/2016 | O'Brien | H04W 4/80 709/205 |

OTHER PUBLICATIONS

International Search Report and Written Opinion, PCTUS2015/046804, dated Dec. 7, 2015.

Extended European Search Report EP15835638, dated Jan. 25, 2018.

Office Action with English Translation, Japanese application No. 2017-510395, dated May 7, 2019.

* cited by examiner

CONTENT MANAGEMENT AND PRESENTATION SYSTEMS AND METHODS

CROSS REFERENCES TO RELATED APPLICATIONS

This application claims the benefit of U.S. Provisional Application Ser. No. 62/041,585 entitled "DriiverSeat™", filed Aug. 25, 2014, the disclosure of which is expressly incorporated herein by reference thereto.

FIELD OF INVENTION

The embodiments of the present invention are generally related to software applications, and in particular, to collaboration, presentation, and marketing systems.

BACKGROUND OF THE INVENTION

Pharmaceutical companies are some of the biggest marketing content creators in the world. They are also one of the most watched and heavily regulated. Drug information frequently changes, and the inability to effectively manage, share, and deliver marketing content and to timely keep up with changes in promotional materials increases compliance risk for the pharmaceutical companies. In addition to a multitude of laws and regulations that govern the dissemination of marketing content, there are also environmental restrictions that limit the dissemination and technological barriers that prevent effective communication of such information in a basic presentation document or webpage. This prevention may also limit the delivery of the presentation and the presentation's effectiveness.

Thus, effective management and delivery of marketing content in the pharmaceutical industry is critical for successful pharmaceutical marketing, and there remains a need for providing pharmaceutical companies systems and methods that can resolve the above deficiencies. Effective techniques are also needed to assist representatives in other areas.

SUMMARY OF THE INVENTION

In a preferred embodiment of the present invention, a system is described for allowing two viewers on two different electronic tablets (e.g., iPads) to co-navigate a presentation and allow a product representative or any user serving as the "Master" or "Presenter" to present information about a product in simultaneous working cooperation in the software application with the recipient, serving as the "Slave" or "Listener" of the information, wherein the system comprises:

two portable tablets loaded with a resident software application operating over the operating system of each tablet, wherein the resident software application is installed on both of the two tablets to provide a dedicated marketing application for sales representatives of a corresponding industry, and further wherein the resident software application is installed on each tablet is configured to include media viewer and a local asset container comprising local storage containing currently available presentation files, wherein the media player of the resident software application is configured to be dedicated to accessing and playing content in the local asset container; and wherein the resident software application is configured to:
(i) establish a direct tablet to tablet communication connection between the resident software application running on each tablet upon the use of synchronization option within the resident software application directing the connection synchronization to occur;
(ii) after the communication connection is established, communicate application-level synchronization data through the communication connection;
(iii) retrieve a representative selected presentation, where a copy of the presentation is stored on each tablet and the presentation is retrieved from the local storage of each of the two tablets when the presentation is selected;
(iv) after retrieval of the presentation, using data in two-way communications in the communication channel to synchronize and maintain displays on both tablets to be synchronized,
(v) co-navigate during dual mirroring within the presentation on each tablet in response to interaction with the presentation on each tablet, such that each of the two tablet users can move within and the views remain synchronized, wherein the resident software application does not require an option to designate a sole presenter and instead allows co-navigation, and
(vi) identifies whether there are navigation conflicts, and resolves conflicts by determining which navigation move takes precedence and should be executed without performing the other conflicting navigation move selected by the other user, and wherein the resident software application establishes synchronization between the tablets only using the software resident application installed on each tablet, the tablet to tablet communication connection, and data communicated between the tablets. And can be further configured to:
(vii) provide the ability to configure the application so the "Presenter" or Representatives and the "Listener" or HCP's may annotate presentations to improve Representative-HCP interactions;
(viii) provides the ability for the "Presenter" or Representative to turn-off co-navigation if needed to ensure that they are able to cover the materials with the "Listener" or HCP without interruption.

In preferred embodiment, the connection between the presenter and the listener is established via the use of Bluetooth. The resident software application is configured to present pharmaceutical, or healthcare related and pharmaceutical compliant presentations in an in-office environment to physicians or other health care providers In one embodiment, the resident software application is configured to include software features that implement health care related regulation and present pharmaceutical compliant healthcare assets.

In another embodiment, the software application is configured to include data privacy features.

In a preferred embodiment, the resident software application is configured to identify navigation conflicts from the separation in time between receiving a navigation instruction from each of the tablets and determining whether the separation is less than a minimum threshold (e.g., 0.0, 0.5 seconds) and adapted to determine a conflict if the separation is less than the minimum threshold. The resident software application may block and void the HCP command in favor of the representative command when the resident software application determines that a navigation conflict exits. In some embodiments, the application implements a synchronization and conflict resolution process in which a time stamp is attached to user actions (each user action) applied to the Representative tablet in the application and the action and timestamp are sent to the HCP tablet through the Bluetooth communication connection. A user action applied on the HCP tablet is sent over the communication connection with the last timestamp of a Representative action that was applied on the HCP tablet. The application (on the Representative tablet) will then compare the received timestamp to the last timestamp that was sent with a Representative action for execution on the HCP tablet. The application will not allow the HCP action to be applied and be effected in the application (e.g., displayed) if the current (last transmitted) timestamp (from HCP) is different from the timestamp transmitted and received from HCP tablet (indicating the last Representative action applied on the HCP). This process if further discussed below.

In yet another embodiment, a method comprising the computer implemented software process steps implemented above for presenting a marketing presentation in an in-office environment using communications and resident software application operation on two local tablets is also envisaged.

In still other embodiments, a non-transient computer readable medium containing computer readable instructions executable by a computer that when executed as part of resident software application on a portable device, the device carries out steps comprising the software process described above is also contemplated.

In another preferred embodiment of the present invention, a content management and presentation system is contemplated. The system may comprise:

a first tablet loaded with a resident software application operating over an operating system of the first tablet, the first tablet allowing a first user to navigate a presentation;

a second tablet loaded with the resident software application operating over an operating system of the second tablet, the second tablet allowing a second user to co-navigate the presentation; and wherein the resident software application of the first and second tablets includes a media viewer and a local asset container comprising a local storage filled with presentation files, the media viewer is configured to access and play the presentation files, and the resident software application of the first and second tablets is configured to:

(i) establish a direct tablet-to-tablet communication connection between the resident software applications through a synchronization option of the resident software application, wherein the communication connection is established without involving a server;

(ii) after the communication connection is established, communicate application-level synchronization data through the communication connection;

(iii) retrieve a representative selected presentation, where a copy of the representative selected presentation is stored on each tablet and the representative selected presentation is retrieved from the local storage of each of the two tablets when the representative selected presentation is selected;

(iv) after retrieval of the representative selected presentation, use data in two-way communications in a communication channel in the communication connection to synchronize and maintain displays on both tablets to be synchronized;

(v) co-navigate during dual mirroring within the representative selected presentation on each tablet in response to interaction with the representative selected presentation on each tablet, such that each of the two tablet users can navigate within the representative selected presentation and views of the representative selected presentation remain synchronized; and (vi) identify whether there is a navigation conflict and resolve the conflict by determining which navigation move takes precedence and should be executed without performing a conflicting navigation move selected by one of the users.

In one embodiment, the communications connection may be established using Bluetooth.

In yet another embodiment, the resident software application may be further configured to present pharmaceutical compliant presentations in an in-office environment to physicians or other health care providers.

In yet another embodiment, the resident software application may be further configured to include software features that implement health care related regulation and to present pharmaceutical compliant presentations.

In yet another embodiment, the software application may be further configured to include data privacy features.

In one embodiment, the resident software application may identify a navigation conflict by determining a time difference between the time a representative command is inputted and the time a HCP command is inputted, determining whether the time difference is less than a minimum threshold, and determining if a navigation conflict exits when the time difference is less than the minimum threshold. The resident software application may block and void the HCP command in favor of the representative command when the resident software application determines that a navigation conflict exits.

In yet another preferred embodiment of the present invention, a method comprising computer implemented software process steps for presenting a presentation is contemplated. The method may comprise:

establishing a direct tablet-to-tablet communication connection between a resident software application installed on a first tablet and the resident software application installed on a second tablet, wherein the communication connection is established without involving a server and the resident software application includes a media view and a local asset container comprising a local storage filled with presentation files;

communicating, after the communication connection is established, application-level synchronization data through the communication connection; data being transferred over is exclusively the navigation coordinates and other possible event parameters but not any screen images. Other embodiments are contemplated.

retrieving a representative selected presentation, where a copy of the representative selected presentation is stored on each tablet and the representative selected presentation is retrieved from the local storage of each of the two tablets when the representative selected presentation is selected;

using, after retrieval of the representative selected presentation, data in two-way communications in a communication channel in the communication connection to synchronize and maintain displays on both tablets to be synchronized;

co-navigating during dual mirroring within the representative selected presentation on each tablet in response to interaction with the representative selected presentation on each tablet, such that each of the two tablet users can navigate within the representative selected presentation and views of the representative selected presentation remain synchronized; and identifying whether there is a navigation conflict and resolve the conflict by determining which navigation move takes precedence and should be executed without performing a conflicting navigation move selected by one of the users.

In one embodiment, the step of establishing a direct tablet-to-tablet communication connection is through Bluetooth.

In yet another embodiment, the method may further comprise presenting pharmaceutical compliant presentations in an in-office environment to physicians or other health care providers.

In yet another embodiment, the method may further comprise implementing health care related regulation and presenting pharmaceutical compliant presentations.

In yet another embodiment, the method may further comprise implementing data privacy features.

In one embodiment, the resident software application may identify a navigation conflict by determining a time difference between the time a representative command is inputted and the time a HCP command is inputted, determining whether the time difference is less than a minimum threshold, and determining if a navigation conflict exits when the time difference is less than the minimum threshold. The resident software application may block and void the HCP command in favor of the representative command when the resident software application determines that a navigation conflict exits.

In yet another preferred embodiment of the present invention, a non-transient computer readable medium containing computer readable instructions executable by a computer that when executed as part of resident software application on a tablet, the tablet carries out the following steps is contemplated:

establishing a direct tablet-to-tablet communication connection between a resident software application installed on a first tablet and the resident software application installed on a second tablet, wherein the communication connection is established without involving a server and the resident software application includes a media view and a local asset container comprising a local storage filled with presentation files;

communicating, after the communication connection is established, application-level synchronization data through the communication connection; data being transferred over bluetooth is exclusively the navigation coordinates and other possible event parameters but not any screen images.

retrieving a representative selected presentation, where a copy of the representative selected presentation is stored on each tablet and the representative selected presentation is retrieved from the local storage of each of the two tablets when the representative selected presentation is selected;

using, after retrieval of the representative selected presentation, data in two-way communications in a communication channel in the communication connection to synchronize and maintain displays on both tablets to be synchronized;

co-navigating during dual mirroring within the representative selected presentation on each tablet in response to interaction with the representative selected presentation on each tablet, such that each of the two tablet users can navigate within the representative selected presentation and views of the representative selected presentation remain synchronized; and identifying whether there is a navigation conflict and resolve the conflict by determining which navigation move takes precedence and should be executed without performing a conflicting navigation move selected by one of the users.

In one embodiment, the step of establishing a direct tablet-to-tablet communication connection is through Bluetooth.

In yet another embodiment, the computer readable medium may further comprise presenting pharmaceutical compliant presentations in an in-office environment to physicians or other health care providers.

In yet another embodiment, the computer readable medium may further comprise implementing health care related regulation and presenting pharmaceutical compliant presentations.

In yet another embodiment, the computer readable medium may identify a navigation conflict by determining a time difference between the time a representative command is inputted and the time a HCP command is inputted, determining whether the time difference is less than a minimum threshold, and determining if a navigation conflict exits when the time difference is less than the minimum threshold. The resident software application may block and void the HCP command in favor of the representative command when the resident software application determines that a navigation conflict exits.

In all the above embodiments, the described steps and features are performed by tablets or iPads via instructions received from the resident software application.

Figure 1:
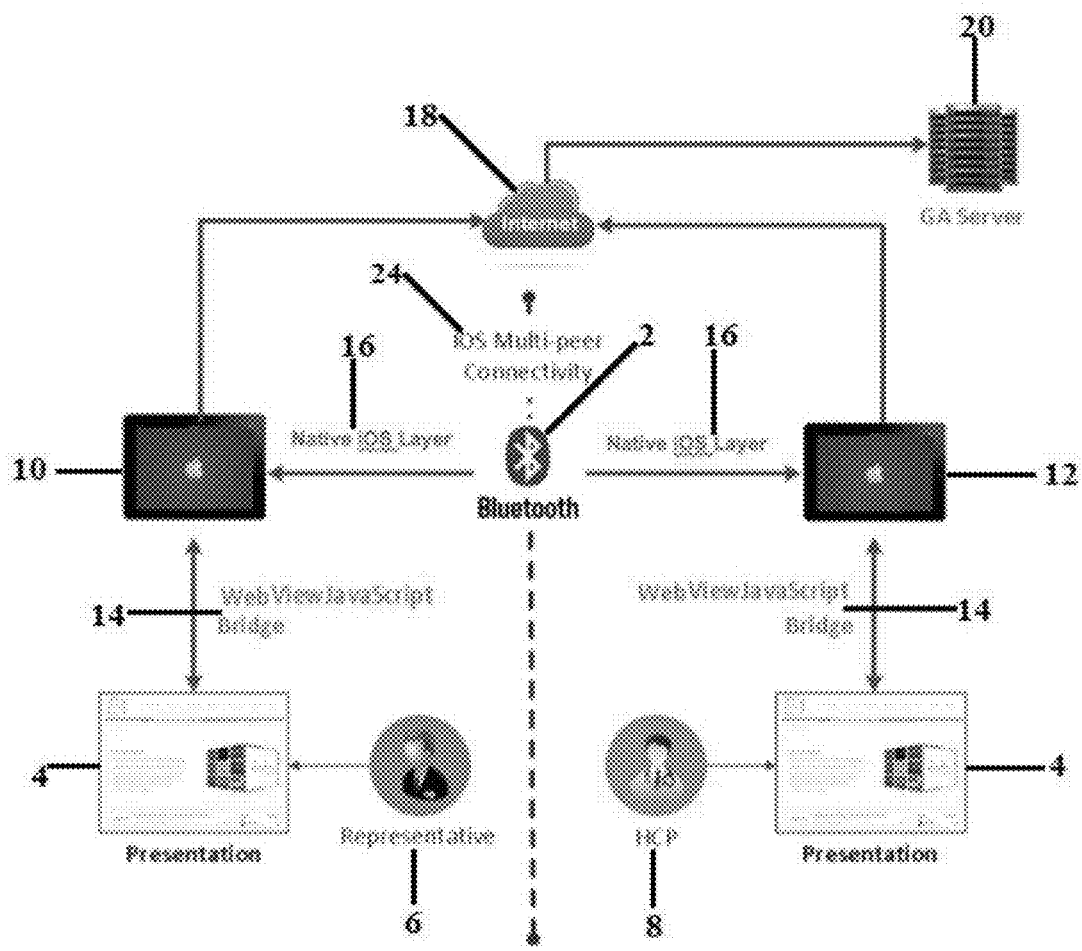
FIG. 1 depicts a diagram showing how the individual components of the DriiverSeat™ mobile application interact with each other in accordance with an embodiment of the present invention.

In addition to Pharmaceutical Sales Representative and HCP communications, DriverSeat™ is not limited to these two roles of the Pharmaceutical industry. For illustrative purposes this document highlights the Pharmaceutical Representative at the "Presenter" and the HCP as the "Listener" and their interaction and usage. However, DriverSeat™ can facilitate interactions between HCPs and Patients, Clinical Nurse Educators and HCPs, Account Representatives and Payers, as well as other industries such as Advertising (Business Development as a "Presenter" and a Prospective Client as a "Listener"), and Financial Services (e.g. Financial Planners as "Presenters" and Clients as "Listeners") for example.

DETAILED DESCRIPTION OF THE INVENTION

This discussion herein provide descriptions of the functionality, structure, operation, and components of illustrative embodiments of the present invention. This is provided by way of certain specifications such as User Needs and also by other content below such as description of structure and operation of preferred embodiments and associated Figures. In some aspects, the specifications describe a commercial design and implementation of an application or system referred to as DriverSeat™. For convenience, embodiments or features of embodiments of the present invention are referred to by the name of the commercial product DriverSeat™. The present invention(s) is not limited to the commercial design, but it's implementation does include unique aspects that are described herein. The description including the discussion of the commercial product demonstrate technological improvement and advantages provided by embodiments of the present invention.

At a high level, software applications, processes, medium, and systems are provided that allow two viewers on two different electric tablets such as but not limited to iPads to view the same content on both iPads. A primary viewer is able to control all functions, while a secondary viewer has access to certain features and functions. The two devices may be connected to each via Bluetooth (or WiFi depending upon availability). Different functional or operational requirements are incorporated into the embodiments of the present invention.

Certain features that fulfill user needs (DriverSeat™) are included in the design:
  Marketers: Provides a platform that can accommodate HTML or PDF presentation assets that will be featured across both iPads when sales representatives visit HCPs.
  Sales Representatives:
    2 iPads
    FAQs
    Technical Guidance around Application Programming Interface (API)
    First time use guide and initial Sales Operations training session (web or live)
    Possesses full control of the connection between the two connected devices in addition to full control of all available navigation within the shared/mirrored HTML or PDF presentation.
  Health Care Physicians (HCP): Will possess the ability to navigate to approved sections of the shared/mirrored HTML or PDF presentation.
  Corporate IT: To supply support for any needed network access within client pharmaceutical company infrastructure, mobile app requirements for their corporate infrastructure, and testing of the DriverSeat™'s apps in conjunction with the client's iPad built prior to deployment to the field force. As a matter of process, corporate IT would be supplied with initial problem resolution guide and FAQ documents in order to provide support for the field force through a Help Desk. The system or tool is developed and configured by a company such as a marketing agency for use by their clients, which can be pharmaceutical companies.

Certain base functional features included in the design:
  Ability to store and access multiple pharmaceutical client healthcare compliant presentations ("assets" or "presentations").
  Dashboard for users to manage assets (presentation library).
  Control panel to ensure connection between 2 devices and to designate master and secondary iPads.
  Ability for the company (e.g., marketing agency or their respective client) to manage and control asset updates.

Management of updates are included in embodiments:
  The company (e.g., marketing agency or their respective client) will control asset updates of pharmaceutical compliant materials such as the above-mentioned presentations. These compliant assets can be downloaded to tablets using a server over a network or by using a wired connection to a local computer. In some embodiments, described herein, marketing agency implements and provides the DriverSeat™ application for use by a site or marketing force of an agency's clients.
  Basic data collection information such as slides visited and time spent is collected in the system.

The following provides itemization of certain functionality/functionality attributes, among others, can be incorporated into the system:
  Control Panel—Vehicle for assigning master control and syncing via Bluetooth-based connection. Client or pharmaceutical sales representative devices may also be referred to as "Master" or "Presenter" and HCP devices may be referred to as "Slave" or "Listener."
  The Control Panel has a graphic user interface available on the tablet such as the controlling tablet.
  The DriiiverSeat™ software will include a Content Management System (CMS) for the pharmaceutical company where approved presentations are uploaded for use by Representatives and download to their iPads.
  The analytics software provider (e.g. Google Analytics or others) will include a Dashboard—for metrics/analytics. The Dashboard has a graphic user interface for providing interactive access to metrics/analytics of DriverSeat™ data.
  The software will include an API (Application Programming Interface). Downloadable API code snippet and documentation if needed that allows pharmaceutical clients or marketing companies to integrate their presentation content with DriverSeat™.

The Control Panel functionality can include:
- Identification of HCP tablets that are available for connection.
- Bluetooth Connectivity Status.
- Pharmaceutical Compliant Asset Library (access to the Library).
- Ability to select an HCP tablet for synchronization.

In some embodiments, DriiverSeat™ is implemented as an iPad application with the primary aim of being used for sharing medical presentations, also called an iDetail, with healthcare clientele using two iPads. This mobile app is developed for two specific audiences i.e. pharmaceutical sales representatives and Health Care Professionals (HCP). However, the technology, if desired, can be implemented for other situations involving a representative such as those requiring marketing related technology. As such, it should be understood that, for convenience, the term sales representative or representative is sometimes used. In the preferred embodiment, the software application has specifically been designed to operate without the need of Internet connectivity and a server, since a skilled artisan will realize that they are often not usually available in hospitals or doctor's offices.

The pharmaceutical sales representatives will promote their healthcare products to HCP's. They load the promotional presentations on the iPad devices and go through them with the HCP.

The HCP will listen to the presentation demonstrated by the representative and ask questions. HCP's may also interact with the presentation which then effectively puts them literally in the "DriverSeat™."

Pharmaceutical detailing is a 1:1 marketing technique used by pharmaceutical companies to educate a physician about a vendor's products. The main purpose of the DriiverSeat™ mobile application software as used in the Pharmaceutical industry is to further engage healthcare providers by letting them participate in detailing sessions through their own iPad rather than sharing them with pharmaceutical sales representatives. Communication between devices is done via Bluetooth to eliminate any need for Internet services, since those services are often unavailable in hospitals and medical clinics. The use of Bluetooth can also help to avoid the need for WiFi or WLAN (or such setup). The system provides the following capabilities:

1. Secure Bluetooth connectivity with automatic reconnection if connectivity is lost.
2. Library for storing iDetail presentations and reference documents.
3. Display and mirroring of HTML and PDF presentations on two iPads.
4. Both users can co-navigate and interact with the presentation.
5. The representative can enable/disable the co-navigation.
6. Medical legal compliance by disabling "Pinch to Zoom" so a pharmaceutical sales representative cannot arbitrarily adjust the focus of a page (e.g. ensures that Important Safety Information (ISI) is displayed appropriately).
7. Offline analytics to track activity initiated by representatives and HCP's which is then aggregated by presentation and pharmaceutical sales representative team.

This software application is a mobile based application specifically designed for iPads. In one embodiment, the application is developed using Objective-C with IOS SDK's. The presentation layer of the application is developed using JavaScript technology. The iPads are integrated using the Multi-peer Connectivity & Bluetooth LTE. Google Analytics is used for event tracking Other analytics and software products may also be used to capture data. The architectural components of the system are:
- Bluetooth Connect/Reconnect module.
- Presentation Library.
- Mirroring & Co-Navigation Logic.
- Native iPad iOS application Layer.
- WebviewJavascriptBridge.
- Google Analytics (GA).

Now referring to FIG. 1, one embodiment of the content management and presentation system is illustrated. The system may comprise a first electronic device 10 and a second electronic device 12. The first electronic device 10 and the second electronic device 12 may communicate with each other via Bluetooth 2 or other wireless technologies. The electronic devices 10, 12 may be a tablet (e.g., iPad), a smart phone (e.g., IOS iPhone, Android operating system device), or other computing devices (e.g., desktop computer, laptop computer) Preferred embodiments are particularly suited for Tablets. In this embodiment, the first electronic device 10 may be the representative's iPad and the second electronic device 12 may be the HCP's iPad. Each of the iPads 10, 12 may store presentations 4 locally in a content library and pass pointer event information (e.g., only pass pointer event information) to the other device via Bluetooth 2. The receiving device then re-executes the event locally to achieve a so-called mirroring effect. Mirroring should be understood as the transmission and execution of actions from one iPad 10 to another iPad 12 within a presentation. Google Analytics tags are also manually inserted into the presentation HTML code during the content development process, such that whenever a user event occurs, these tags are fired and the data is passed to Google. This, however, is done via the use of the Internet 18 through Google Analytics product servers 20. A similar process is or may be used to send data to other analytics or software providers.

The passing of the event data between iPads 10, 12 to achieve mirroring is handled in the following logical steps:
- Events such as taps, swipe, scroll, other gestures or the like are captured by WebviewJavascriptBridge 14 when a user is within an HTML or PDF presentation 4.
- It then passes the events to the Native iPad iOS layer 16, which sends the event data to the receiving device 12 via Bluetooth 2.
- The process is then reversed by the receiving device 12 in order to execute the event locally to achieve the mirroring effect.

Software Versions (Example of Software Specification for Commercial Implementation)

| Technology | Details |
| --- | --- |
| Integrated Development Environment | XCode 6.0 and above |
| Development Platform | IOS 8.0 |
| Development Language | Objective-C, JavaScript |
| Unit Testing | Manual testing |
| Source Control | |
| Connectivity | Bluetooth Connectivity |
| Other Framework's and API's Used | Cocoapods 0.36.0, Google Analytics 3.10, WebviewJavascriptBridge 4.1.4, JQuery 2.1.0 |
| Distribution | Apple Enterprise and B2B distribution |
| Certificates and Provisions | Developer Certificate and mobile provision Distribution Certificate and mobile provision |

Supported Devices

| Devices | Versions |
|---|---|
| iPad 2$^{nd}$ Generation and above | IOS7.0 and above |
| iPad Mini | IOS7.0 and above |

Certain security features are incorporated into the system:
a. DriiverSeat™ software application relies on standard iPad iOS Passcode Security to prevent unwanted unauthorized access.
b. Only devices that are running DriiverSeat™ will appear on the Device connection list.
c. Peer connections are secured using the MultipeerConnectivity framework.
d. Sessions are disconnected when the application moves to background/locked state.
e. Only the pharmaceutical sales representative device 10 may:
  i. Select an HCP device 12 in order to sync with;
  ii. Select and launch a presentation 4;
  iii. Enable or disable co-navigation 115; and
  iv. Exit a presentation 4.
Functionality that meets certain use cases are implemented:
  If the connection is lost by the HCP:
  A splash screen is displayed for HCP iPad 12 which disables their access and asks them to please wait. Master iPad 10 has the ability to re-synchronize automatically while HCP holds on.
  If the connection is lost by the Representative:
  A temporary notice is displayed on the Representative iPad informing them that the HCP is no longer connected but still allows the Rep to continue the presentation in single-user mode.
  In either case, if a pharmaceutical representative 6 has not ended the presentation via the close button, the application can determine if a syncing problem occurred and will automatically reconnect and synchronize the two devices once both devices are available. Advantageously no sync server is required for syncing of the tablets 10, 12, which as previously described, is executed predominantly via Bluetooth.

Operation of Preferred Embodiments

In operation, the DriiverSeat™ software application is installed on both iPads and presentations are viewed as an HTML or PDF presentation file, which may be opened by media viewer.

Figure 2:
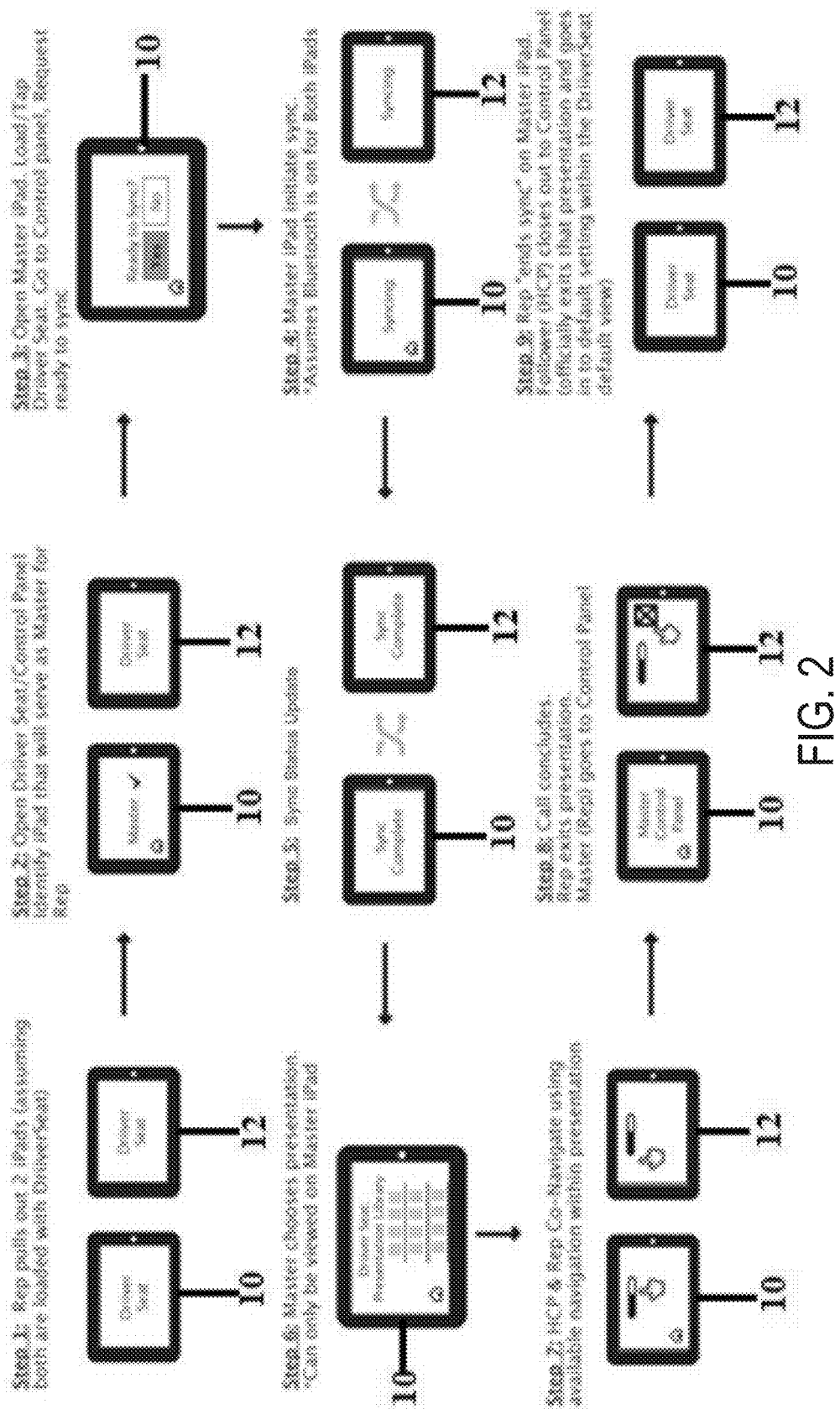
FIG. 2 demonstrates a flow diagram how the communication is established between two iPad tablets both having DriiverSeat™ mobile application installed on the tablets in accordance with an embodiment of the present invention.

Referring to FIG. 2, one embodiment of establishing a communication between two iPads 10, 12 is illustrated. In step 1, the pharmaceutical representative provides two iPads tablets 10, 12 (brings two devices to the meeting) that are both loaded with the DriiverSeat™ software application, such that the presentations can be viewed simultaneously on both iPad tablets 10, 12. Once the iPad tablets 10, 12 are turned on and the DriiverSeat™ software application has been loaded (and running), one of the iPad tablets, 10, 12, such as iPad 10, will be determined to serve as a Master for the pharmaceutical sales representative as depicted in step 2. In steps 3 and 4, the two iPad tablets 10, 12 are synchronized by a near field wireless communications protocol, such as but not limited to Bluetooth, so that the two iPads 10, 12 can be configured to communicate with each other via the data communication link established using the near field wireless communications protocol. If desired, a wireless local area network (WLAN) protocol such as WiFi can also be used to establish the communication link. After synchronization has been confirmed in step 5, the user of Master iPad 10 (the pharmaceutical representative) interacts with the DriiverSeat™ application to choose which presentation from a set of presentation assets for the current meeting and once this has been done, the HCP 8 and the pharmaceutical representative 6 start co-navigating using available navigation means within the presentation as demonstrated in step 7. Once the call or conference of the presentation is concluded, the pharmaceutical representative 6 exits the presentation and the Master on the pharmaceutical representative iPad 10 goes to the control panel as shown in step 8.

Thus, the different presentations are running on the HCP's iPad 12 and the pharmaceutical Representative's iPad 10 and can only be viewed when the iPads 10, 12 are synchronized through Bluetooth 2 or other wireless means such as WiFi as depicted in step 5 of the Use Case Flow Diagram Thus to recapitulate, if pharmaceutical representative 6 initiates an action and starts a presentation on the iPad 10, the same action is afforded and viewed on the other iPad 12. The HCP 8 will have access to approved pharmaceutical compliant presentation navigation options pre-defined as acceptable for the HCP 8. However, the pharmaceutical representative 6 has the exclusive control to access to other files/presentations.

This means that the HCP 8 can only access and view the files to which the pharmaceutical representative 6 identifies and loads for mirroring and sharing. Thus, the HCP 8 can explore the presentation independent of the representative 6, but only along navigable paths approved for HCP 8 navigation. If a navigation event occurs where the HCP 8 and the representative 6 navigate to different areas of the presentation, then the presentation displayed on the iPad 10 of the representative takes precedence over that of the HCP 12.

In operation, the two devices running a connected DriiverSeat™ operating as the Master is configured to be able to access or "see" the locally loaded presentations 4, but the DriiverSeat™ operating on the other tablet is configured to only access or "see" the presentation 4 that is selected on the Master for viewing. The HCP device 12 running DriiverSeat™ is not allowed to access the other locally stored presentations in the DriiverSeat™ application, such that the HCP 8 cannot navigate to, or open the other presentations in the application, even though they are locally stored within the DriiverSeat™ app in the HCP tablet.

In one aspect of embodiments of the invention, the system or method is directed to practicing the technology in an office or local setting wherein two tablets 10, 12 (or other computer devices having displays) are located in close physical proximity to each other, such as in a physical range typical for the operating signal range of Bluetooth or other form of near field wireless personal computer or communication device or protocol (e.g., without needing to pass through a router or access point to establish a connection between devices under that protocol). Alternatively, a Wifi or WLAN communication can be used or other forms of communication connection can be used if desired such as by routing communications to Wifi router or WAN. In preferred embodiments, tablets 10, 12 communicate directly with each other to maintain synchronized views. In preferred embodiments, there is no host or server in the communication between the tablets. It would be understood depending on the implementation that other devices could be in the path such as a router that is operating as part of implementing the communication channel.

The communication channel may refer to a communication path provided by the communication connection. The communication path may be a path established in the communication connection by a certain software application in the iPad, a certain computer hardware in the iPad, or both the certain software application and the certain computer hardware in the iPad. The communication connection may have only one communication path or multiple communication paths. When the communication connection has only one communication path, the communication path is amendable and can be altered by a software application in the iPad, a computer hardware in the iPad, or both the software application and the computer hardware in the iPad to transmit and receive data in a protocol required by the software application, the computer hardware, or both. When the communication connection has multiple communication paths, each of the communication paths may have its own protocol. Some of the software applications and some of the computer hardware in the iPad may be directed to transmit and receive data through one of the communication paths, while other software applications and other computer hardware in the iPad may be directed to transmit and receive data through another communication path. In one embodiment, the communication channel is a communication path in the communication connection that allows DriverSeat™ applications or iPads with DriverSeat™ applications installed to transmit data to each other and to receive data from each other. In such an embodiment, the communication channel is an application level of communication path. This channel is also created and managed for a mirroring communication or the mirroring feature.

Systems, methods, and computer readable medium can be implemented in accordance with varying embodiments of the present invention. For example, a system is implemented for allowing two viewers on a plurality of different tablets to co-navigate a presentation and allow a product representative to present information about a product in simultaneous working cooperation in the software application with the recipient of the information. The system comprises two portable tablets 10, 12 loaded with a resident software application (e.g., DriiverSeat™) operating over the operating system of each tablet 10, 12. More than two tablets 10, 12 are also contemplated, and the resident software application can be a software that is implemented on more than two tablets or on multiple devices. The resident DriiverSeat™ software application is installed on both of the two tablets 10, 12 to provide a dedicated marketing application for sales representatives of a corresponding industry. The resident software application installed on each tablet is configured to include media viewer and a live asset container comprising local storage containing currently available presentation files 4. The media player of the resident software application is configured to be dedicated to accessing and playing content in the live asset container. The resident software application will be configured to allow users to navigate presentations 4 (e.g., HTML presentations) that are stored locally but is preferably not configured to access media content including presentations or web pages external to the resident application or the live asset container.

The resident software application is configured to establish a direct tablet-to-tablet communication connection between the resident software applications running on each tablet. The resident software application includes an option in the Control Panel (e.g., a user selectable list of available tablet devices running DriverSeat™ in the Control Panel). When the option is activated by choosing a tablet device from the list, the application directs the two tablets to perform a synchronization of their communication connection (e.g., establish a Bluetooth 2 connection). The resident software application can make the synchronization option available after the application is activated. The option preferably would be accessible in the application without having to enter "settings" and, for example, "Bluetooth" within the tablets "settings." The resident software application is configured to respond to the selection of the option within the application to pair the two tablets using onboard communication circuits. Using the communications connection established by the synchronization feature, views and navigation on both tablets are synchronized.

During the presentation or meeting session, the resident software application is specially configured to be able to operate in a direct communication session between the tablets (through the direct tablet-to-tablet communication connection) and during this live real time session there is preferably no need for substantive involvement of an intermediate server or potentially routers. In other words, the iPads and the resident software applications can operate in or communicate with each other in real time session without the need for functional assistance from an intermediate device (e.g., router or intermediate device exists in communication path of synchronizing information between but the intermediate primarily only have no function in the synchronization process—such as pass through pipes).

After the communication connection is established, the resident software application is configured to communicate application-level synchronization data through the communication connection. The resident software application is also configured to retrieve a presentation selected by the representative. A copy of the presentation is stored on each tablet and the presentation is retrieved from the local storage of each tablet when the presentation is selected. Variations could include storing the presentation only on one tablet, storing a portion of the presentation on each or both tablets, storing the presentation or a portion of the presentation on an external device such as a server (e.g., one that controls syncing or assisting in syncing). It is contemplated that there may be more than one invention in the contemplated system and therefore, although the preferred system is preferably without the use of a syncing or host server, for some inventions a server or host could be involved.

After retrieval of the presentation 4, the resident software application is configured by the pharmaceutical sales representative 6 to use data in two-way communications in the communication channel to synchronize and maintain displays on both tablets 10, 12 to be synchronized.

The resident software application is configured to co-navigate within the presentation 4 on each tablet 10, 12 in response to interaction with the presentation 4 on each tablet 10, 12. This is such that each tablet 10, 12 user can move within the presentation 4. This is such that the views and content remain synchronized while the users interact with the device and software to navigate the same presentation 4 together at the same time. For example, the two users 6, 8 are permitted to control the presentation 4 at the same time and each navigation control command from each user would be received and carried out unless, for example, there is a conflict for example if two commands were received at the same time or within a short time. As such, the resident software application does not allow for an option to designate a sole presenter and instead allows co-navigation.

The resident software application is configured to identify whether there are navigation conflicts, and resolves conflicts by determining which navigation move takes precedence and should be executed without performing the other conflicting navigation move selected by the other user.

The resident software application preferably establishes synchronization between the tablets only using the software resident application installed on each tablet, the tablet to tablet communication connection, and data communicated between the tablets.

The communications connection can be established using Bluetooth 2. Other near field connections are also contemplated.

As mentioned above, the resident software application is preferably configured to present pharmaceutical or healthcare compliant presentations in an in-office environment to physicians or other health care providers. The resident software application is configured to include software features that implements health care related regulation.

The software application is configured to include data privacy features in some embodiments.

As discussed, the resident software application can also identify if there is a conflict between a navigation command (e.g., representative command) inputted by a user (e.g., representative) of the first iPad and a navigation command (e.g., HCP command) inputted by another user (e.g., HCP) of the second iPad. In one embodiment, the resident software application evaluates the relationship between the navigation commands by determining a time difference between the time the representative command is inputted and the time the HCP command is inputted, determining whether the time difference is less than a minimum threshold, and determining if a conflict exits when the time difference is less than the minimum threshold. If there is a conflict, the resident software application blocks and voids the navigation commanded from the HCP user in favor of the navigation command from the Representative user. Navigation commands may include gesture commands or other commands requesting the resident software application and the iPad to perform actions. The threshold may be in seconds (e.g., 0.0, 0.5 seconds), milliseconds, or other magnitudes or units of time if desired.

Methods comprising the computer implemented software process steps described herein for presenting a marketing presentation in an in-office environment using communications and operation of resident software application on two local tablets are contemplated.

The resident software application is understood to also to refer to its implementation on tablets 10, 12 as a system or its storage in non-transient memory such as on tablets 10, 12. Embodiments of the present invention are particularly suited for pharmaceutical healthcare compliant presentations and related marketing. A Pharmaceutical Client Healthcare compliant presentation is a summary of medically relevant content that pertains to a disease state or medical treatment that has been approved by a Pharmaceutical/Biotech manufacturer and conforms to 21 CFR 314.81(b)(3)(i), where all advertisements and promotional labeling for a particular drug product are submitted at the time of initial publication or dissemination. Each submission is required to be accompanied by a completed transmittal Form FDA-2253. Applications to other fields are also contemplated such as where some other product or service is sought to be marketed.

Data Flow Overview

Figure 3A:
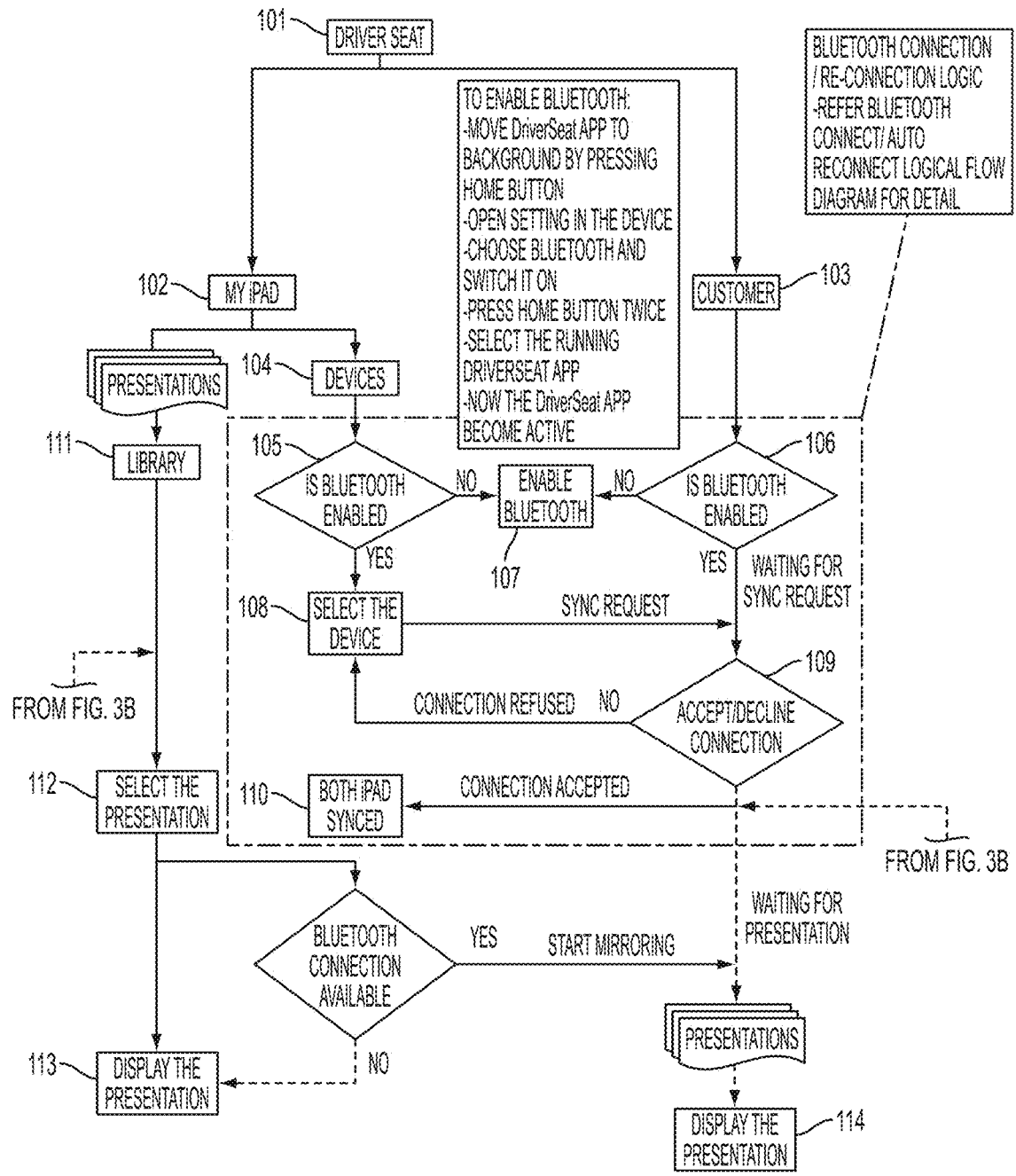
FIG. 3A-3B show the data flow overview between two iPads both having DriiverSeat™ mobile application installed on the tablets in accordance with an embodiment of the present invention.
Figure 3B:
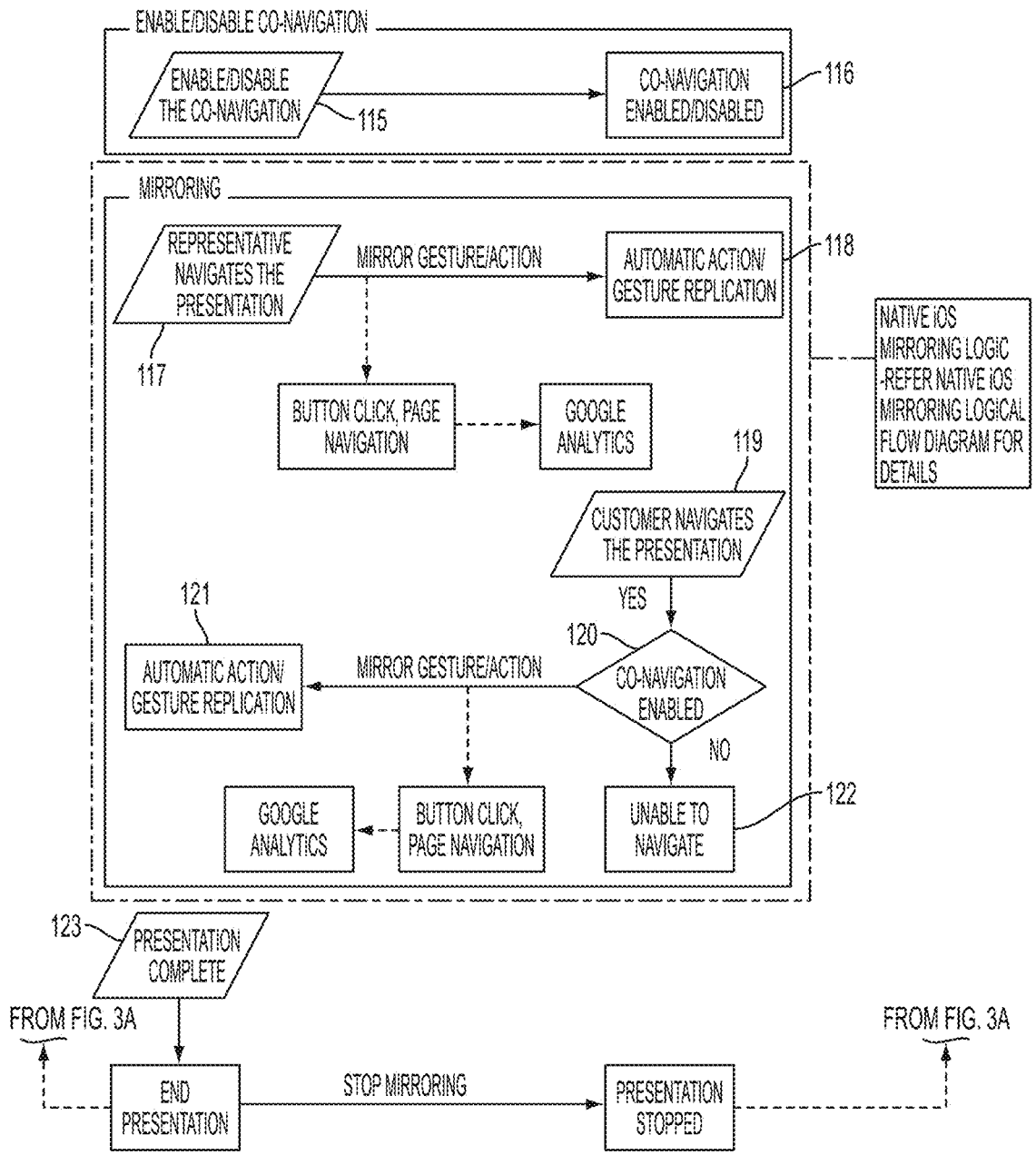

Now referring to FIG. 3, the data flow overview between the two iPads 10, 12 will be described in greater detail in accordance with a preferred embodiment of the present invention.

When launching the DriiverSeat™ application, it navigates to the Identification screen, which has two user options MyiPad (e.g., "Master"/"Representative") 102 and Customer (e.g., "Slave"/"HCP") 103.

When the user chooses MyiPad 102 (as representative 2 user), the software application will display the Devices screen by default, and thus display the list of devices running the application in active state (step 104). If the Bluetooth connection is not enabled, the user will enable the Bluetooth feature in the device settings and search for peer devices to list devices (step 105), or the user will enable the Bluetooth connection and advertise the device through multi-peer connectivity 24 and wait for Bluetooth connection (step 106). Both of these procedures will work to enable the Bluetooth connection (step 107). In step 108, an iPad device 12 is subsequently selected from the available peer's displayed as available on the representative's iPad device 10.

When the user chooses Customer 103 (as HCP user), it will navigate to the HCP screen 12 and begin listening for a Bluetooth connection 2 request. Once the Representative 2 selects the HCP device from the list in the Devices screen, the corresponding HCP 8 app will prompt the user to "Accept" or "Reject" the connection (step 109). Once the user accepts the connection, the iPad devices 10, 12 of the representative 6 and HCP 8 will get into a synced state (step 110). Now both the iPad's 10, 12 have the capability to transmit data between each other via Bluetooth 2.

The Representative user then clicks on the Library option 111. A library screen is displayed in response, that shows the list of loaded presentations (step 111). One of the presentations can be selected by the Representative user (step 112). In response, the presentation 4 gets loaded on the representative's iPad screen 10 (step 113).

A core logic of the DriiverSeat™ app is called "Mirroring." Mirroring should be understood as the action that enables transmission and execution of actions from one ipad 10 to another iPad 12 within a given presentation. The two types of the users are Presenter, also referred to as the representative, and Listener, which is the HCP.

The IOS-Multipeer Connectivity framework 24 is one method that may be used to transmit the data from one iPad 10 to another 12 via Bluetooth 2 as demonstrated in step 114, but also has the capability to leverage from Wi-Fi networks and Peer-To-Peer Wi-Fi.

As stated hereinabove, representatives use the application of the device to select the presentation 4 from the Content Library. Once the presentation is launched, the corresponding event data is sent to the connected HCP iPad 12. When the HCP device 12 receives the event data, it triggers the same event and action on the HCP device 12. At this point, the same presentation 4 will also be launched on the HCP iPad 12. In the same manner, the user actions executed within the presentation 4 are also mirrored until the representative 6 chooses to end the presentation 4.

The representative 6 can also enable or disable the co-navigation (step 115). Co-Navigation is by default always enabled. When co-navigation is enabled, HCP 8 can also navigate the presentation 4 and their actions are passed to the representative's device 10 and are thus mirrored. As such, enabling or disabling states 115 will have an impact on HCP's 8 iPad device 12 (step 116). When representative 6 performs an action or gesture on active presentation 4, it will get reflected on the connected HCP iPad device 12 as depicted (step 118). If HCP 8 performs an action or gesture on the presentation 4, if the co-navigation has been enabled, then the action or gesture will get mirrored, and the action or gesture will be reflected in the representatives iPad device 12 (step 121). However, if co-navigation has been disabled, HCP 8 will be unable to execute an action or a gesture in the presentation (step 122). Once representative 6 is done presenting presentation 4, he or she can double tap on the screen, such that the navigation bar can be exited, and the person can hit the "End Presentation" button in order to end the presentation session (step 123).

While in the connected session, if the app (e.g., the DriverSeat™ application) on either of the devices 10, 12 is moved to the background (e.g., by pressing the device's home button or for some other reason), the session is disconnected. If the connection is lost by the HCP (e.g. Master device moves to the background) then a splash screen is displayed for HCP iPad 12 which disables their access and asks them to please wait. If the connection is lost by the Representative (e.g. HCP device moves to the background) then a temporary message is displayed on the Representative iPad informing them that the HCP is no longer connected but still allows the Rep to continue the presentation in single-user mode.

When the background application is re-launched and comes to the foreground, it automatically reconnects the session and event mirroring is once again restarted.

Actions that are taken within a presentation are tagged using Google Analytics and captured offline. Once the device is connected to the Internet 18, those transactions are sent to Google and displayed on the Google Analytics Dashboard 20. The same approach is or may be used to capture analytics for use with other analytics or software products.

Bluetooth Connection/Auto Reconnect

Figure 4A:
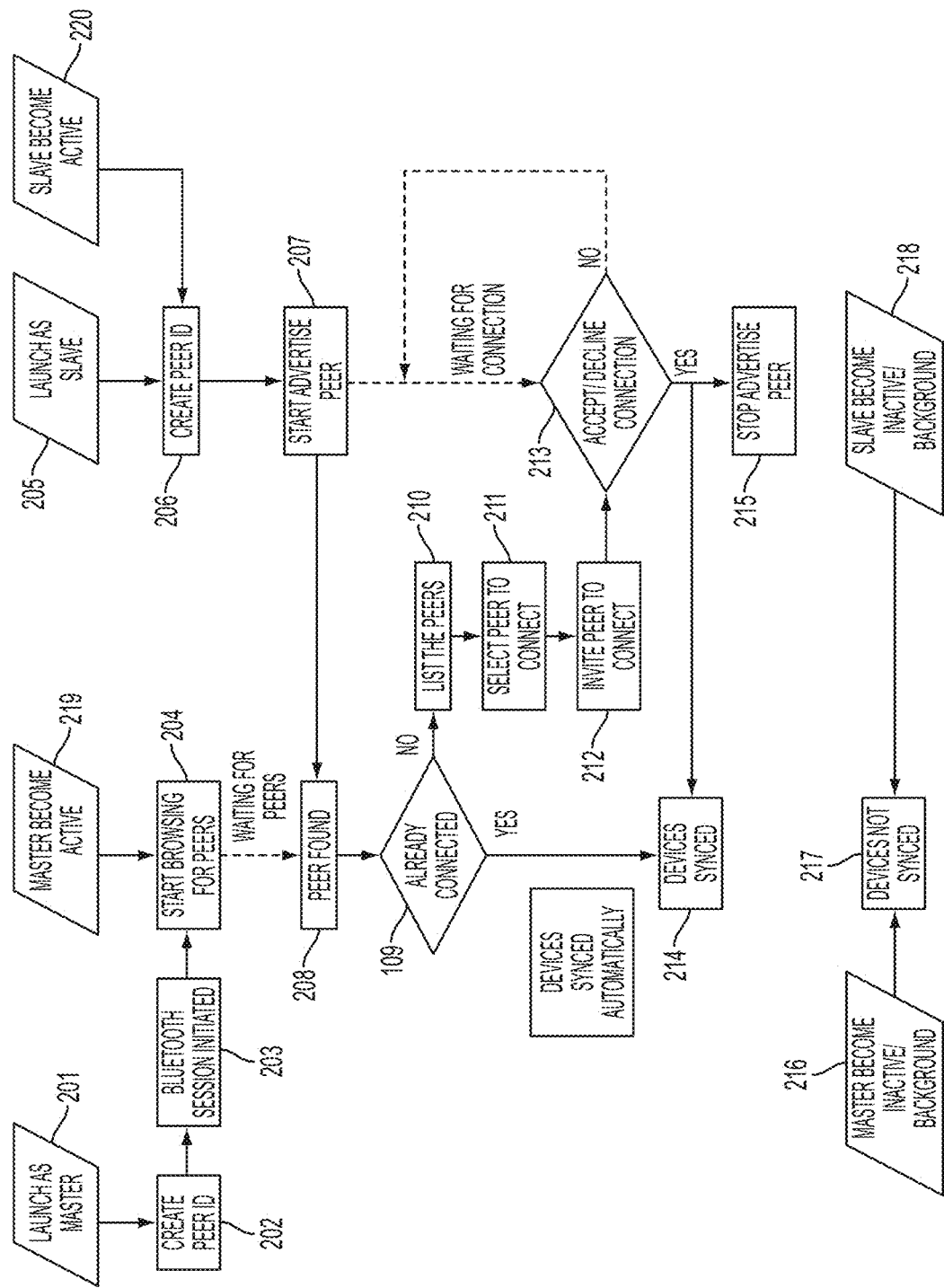
FIG. 4A outlines how Bluetooth connection between the representative's and the HCP's iPad tablets is established in accordance with an embodiment of the present invention.

Now referring to FIG. 4A, the Bluetooth 2 connection between the representative's and the HCP's iPad devices 10, 12 will be outlined in greater detail in accordance with a preferred embodiment of the present invention. When the app is launched by the representative (e.g., "Master" or "Presenter") 201, it will create a Peer Id (e.g., Unique Identifier) for the iPad device 10 shown in step 202, will initiate the Bluetooth session (step 203), and will subsequently start browsing for advertised peers using multi-peer connectivity 24, which will search only for those iPad devices 12 that are running the DriverSeat™ application that are available in a close proximity range (step 204). In one embodiment, this range will be within 0 to 12 feet or further without losing the syncing capability, but one of ordinary skill in the art will appreciate and realize that a different range that efficiently allows communication by using Bluetooth may equally apply. The DriverSeat™ app will also be launched on the HCP IPad (step 205) and a Peer Id (e.g., "Slave" or "Listener") 206 will automatically be created for iPad device 12. Ipad device 12 will start advertising as being available (step 207) by using multi-peer connectivity 24 through Bluetooth connection 2 and subsequently waits for proper connection.

Once advertised peers are found (step 208), and if the representative's iPad device 10 finds that it is already in a connected mode (e.g., from the saved connected Peer Id's list), the Master iPad device 10 will automatically sync with the HCP iPad device 12 and initialize the connectivity session and reconnect to the previously connected device (step 209).

If the device is not already connected, it will list the available peer devices 12 on the screen to the user (step 210). The user will then manually have to choose which device (e.g., peer), that the user wants to connect to (step 211), and the app will invite the HCP device 12 to thereby connect (step 212). Once HCP 8 user manually accepts the invitation on his or her iPad, the connectivity session is initialized (step 213). If the user accepts the connection, it follows that both the representative's and the HCP's iPad devices 10, 12 will get into the synced state. At this point, the HCP Peer iPad will stop advertising, and instead start waiting for the presentation mirroring.

When the app on the representative or HCP iPad devices 10, 12 moves to background or in an inactive state (steps 216 and 218), the session will progress into a non-synced state (step 217), and the session will thus be disconnected. Once the Master and Slave DriiverSeat™ return back to the active foreground (steps 219 and 220), this will result in the iPad devices 10, 12 automatically reconnecting using the same reconnection logic as described above.

Figure 4B:
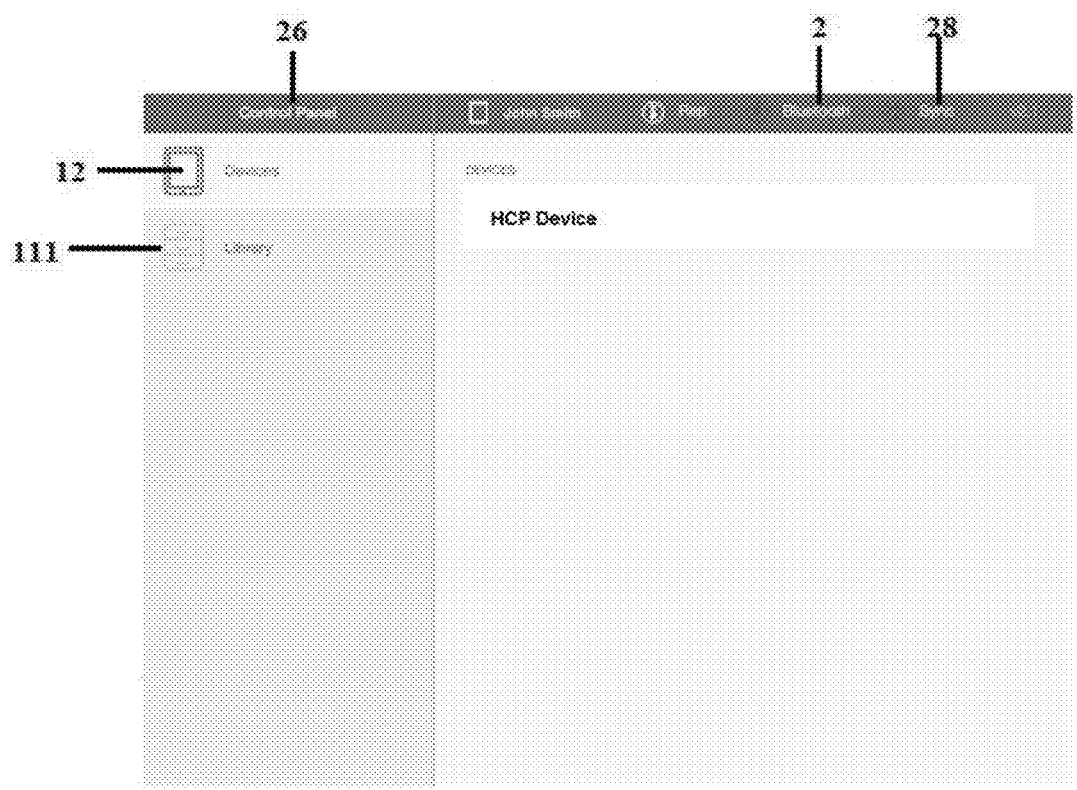
FIGS. 4B-4D show sample screenshots of the Bluetooth Interface User Flow in accordance with an embodiment of the present invention.
Figure 4C:
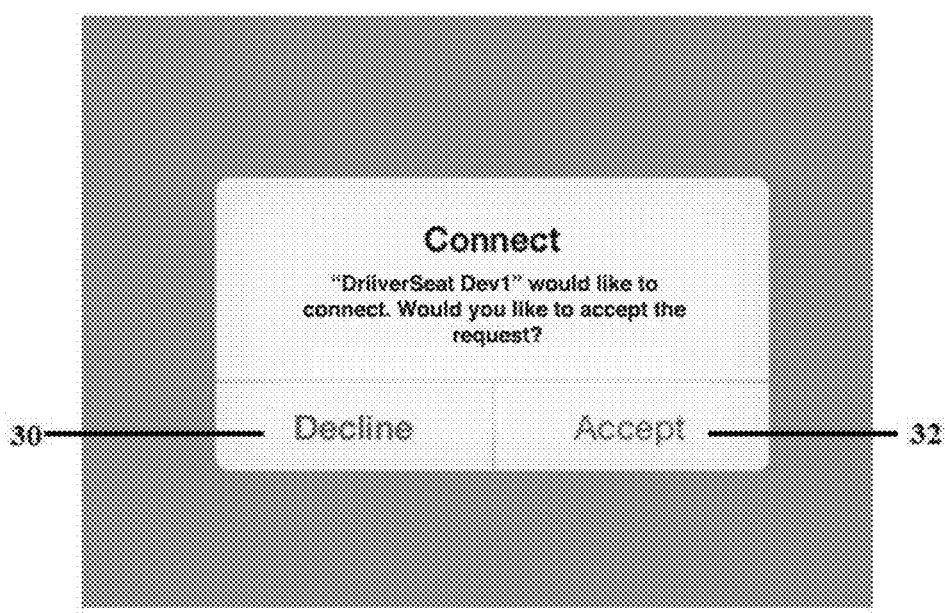
Figure 4D:
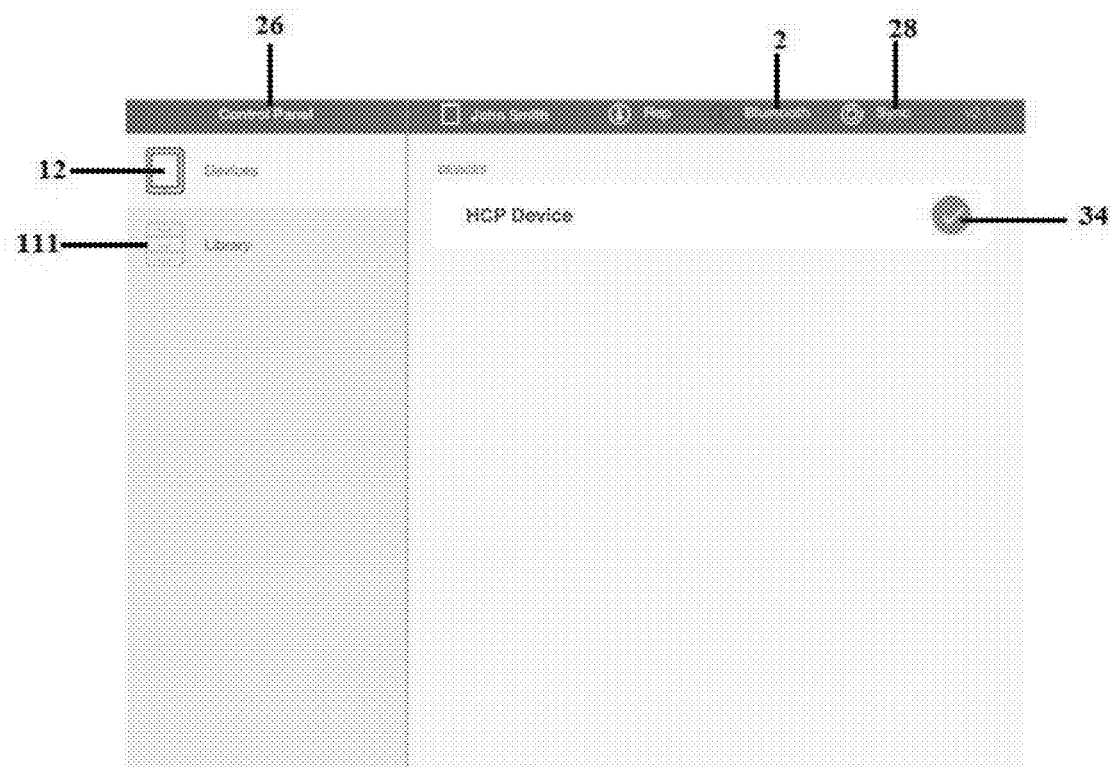

FIG. 4B demonstrates sample screenshots of the bluetooth interface user flow, wherein available iPads devices 12 are shown on the Master's interface. In addition, on the Master's interface, Control Panel 26, content library, the Bluetooth connection 2 and syncing 28 features are also applicable. FIG. 4C illustrates a slave connection invite, wherein the slave has the option to either tap the "Decline" 30 or "Accept" 32 buttons, while FIG. 4D shows Master iPad 10 being in a connected state illustrated by the "Approval" symbol 34 being in an activated state.

Presentation Library

Figure 5A:
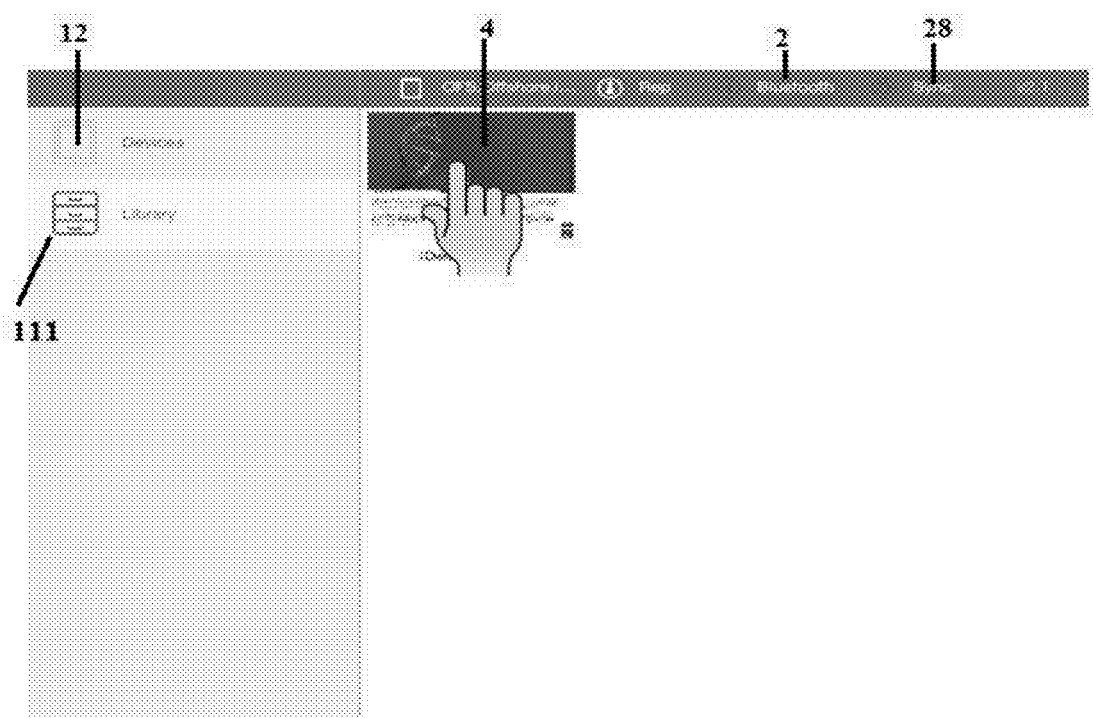
FIGS. 5A-5C demonstrate the Presentation Library in accordance with an embodiment of the present invention.
Figure 5B:
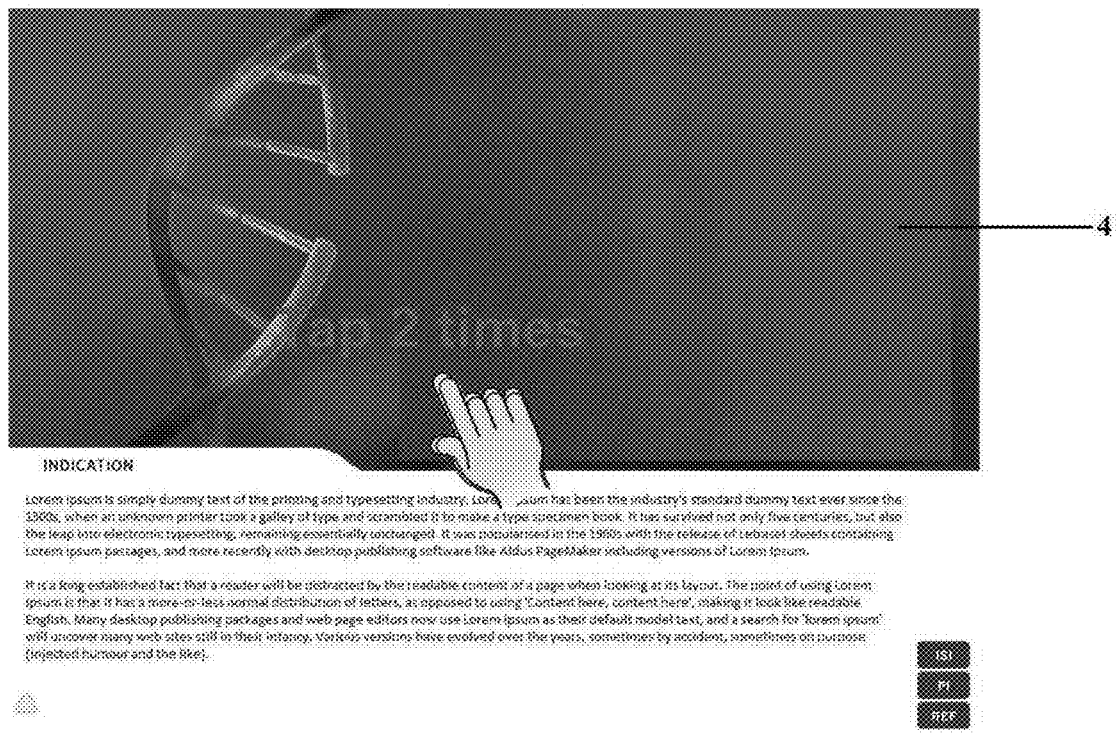
Figure 5C:
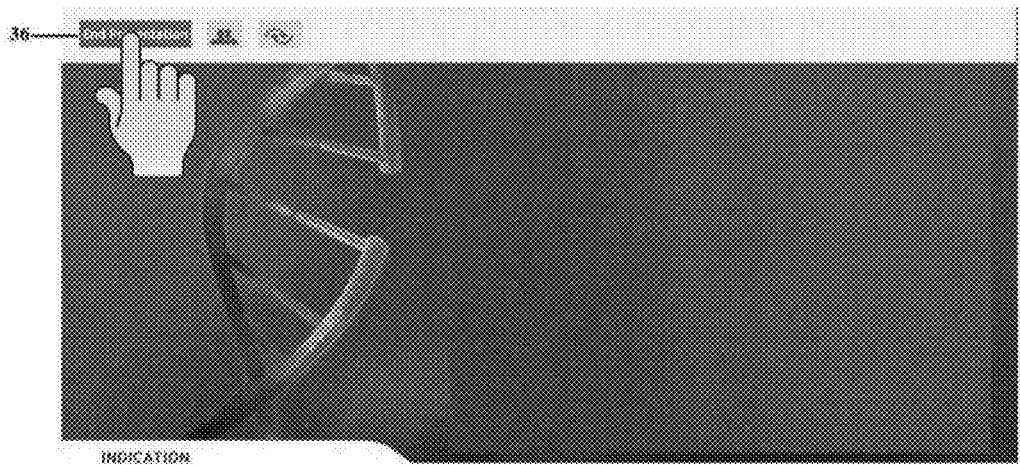

Now referring to FIGS. 5A-5C, the presentation library 111 will be outlined. HTML or PDF presentations 4 are stored on both the representative's and HCP's iPad devices 10, 12. Thumbnails are displayed on the library user interface to make the selection intuitive. In the system, only representatives have access to the presentation library 111. Once a presentation 4 is selected by the representative as shown in FIG. 5A, it is displayed, and then mirrored on the HCP's iPad device 12 as previously described in this disclosure. The representative's toolbar is activated by double tapping anywhere within the presentation 4 as depicted in FIG. 5B. Only representatives 6 have access to the presentation toolbar to end a presentation 4 as well. Once a presentation 4 is ended by tapping the "End Presentation" button 36 as shown in FIG. 5C, the representative is then brought back to the library selection screen on the presentation library 111, and a message will thus be displayed on the HCP device 12 stating "Ready to present. Please wait for document to be loaded."

Native iOS App Mirroring

Figure 6:
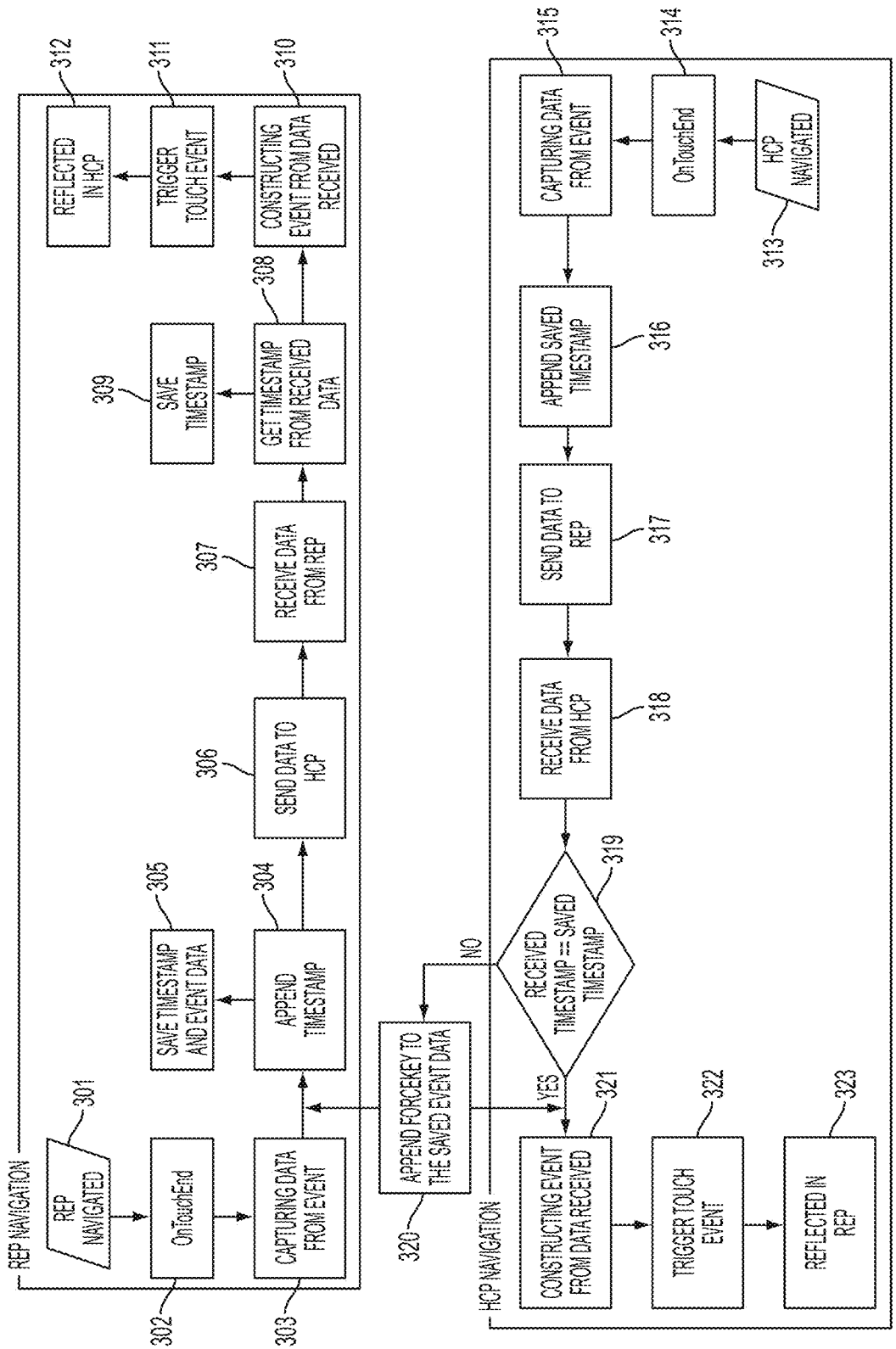
FIG. 6 shows a flow diagram of the Native iOS App Mirroring in accordance with an embodiment of the present invention.

Now referring to FIG. 1 and FIG. 6, the Native iOS App Mirroring will be described in more depth. Whenever the representative or HCP executes an action or navigates within the presentation 301, the OnTouchEnd event triggers a process 302, wherein the details are captured in the HTML JavaScript presentation layer, WebviewJavascriptBridge 14, and passed to the native (iOS) layer 16 in step 303. As earlier described in this disclosure, the Native iOS mirroring layer 16 is responsible for passing data between the two iPad devices 10, 12. Specifically FIG. 1 demonstrates how the two mirroring components, Native iOS layer 16+WebviewJavascriptBridge 14 interact with each other.

If the action was executed by the representative, then the current timestamp will be appended to the event data 304, and then sent to the connected HCP device 12 through the Bluetooth connection 2 and multi-peer connectivity 24 session as shown in step 306. The timestamp and event data can also be saved locally for future verification purposes by the representative demonstrated in step 305. Once the HCP 8 receives the event data from the representative in step 307, the HCP gets the timestamp from the received data 308 and stores the timestamp locally 309, and then the HCP passes the data to the HTML JavaScript presentation layer through the WebviewJavascriptBridge 14. The JavaScript program will then construct the event and execute it in the presentation 4 shown in step 310 and will trigger the corresponding event at step 311 and the navigation gets reflected on the HCP tablet 12 depicted in step 312.

The reverse procedure will take place when the mirroring between HCP and representative is established. Instead of the current timestamp, the slave appends the last received timestamp (from a representative action) to the data at step 316 and sends the data to the representative outlined in step 317. Once the representative receives the data from the slave 8 (HCP tablet) in step 318, it compares the received timestamp with the latest saved representative-action timestamp (319). If the timestamp matches, the representative tablet 6 will then construct the event from the data received 321 and trigger the received event 320 so that it is reflected on the representative tablet 323.

If the timestamp does not match, then the representative tablet 6 will resend the latest event occurred (Representative action applied to Representative tablet) with the current timestamp with a force key to both the Representative and slave HCP tablets at step 320. The Representative device 6 will then construct the event from the saved latest event with the force key 321, and trigger the saved latest event 322 so that it is reflected on the representative tablet 323 (overriding the HCP action). In parallel that data will also be passed to the HCP tablet by appending a new timestamp 304, send the data to the HCP tablet 306, the HCP then receives the event 307, saves the new timestamp 309, constructs the event received 310 and triggers the event 311 so that it is reflected on the HCP tablet 312. The application uses the timestamp from representative actions (by sending to HCP and then back to representative) in order to determine whether an HCP action conflicts or the HCP tablet is out of sync. If out of sync, the timestamp can be used sequentially to bring the HCP tablet up to sync, if desired, or it can just skip to the current state.

WebviewJavascriptBridge Mirroring

Figure 7:
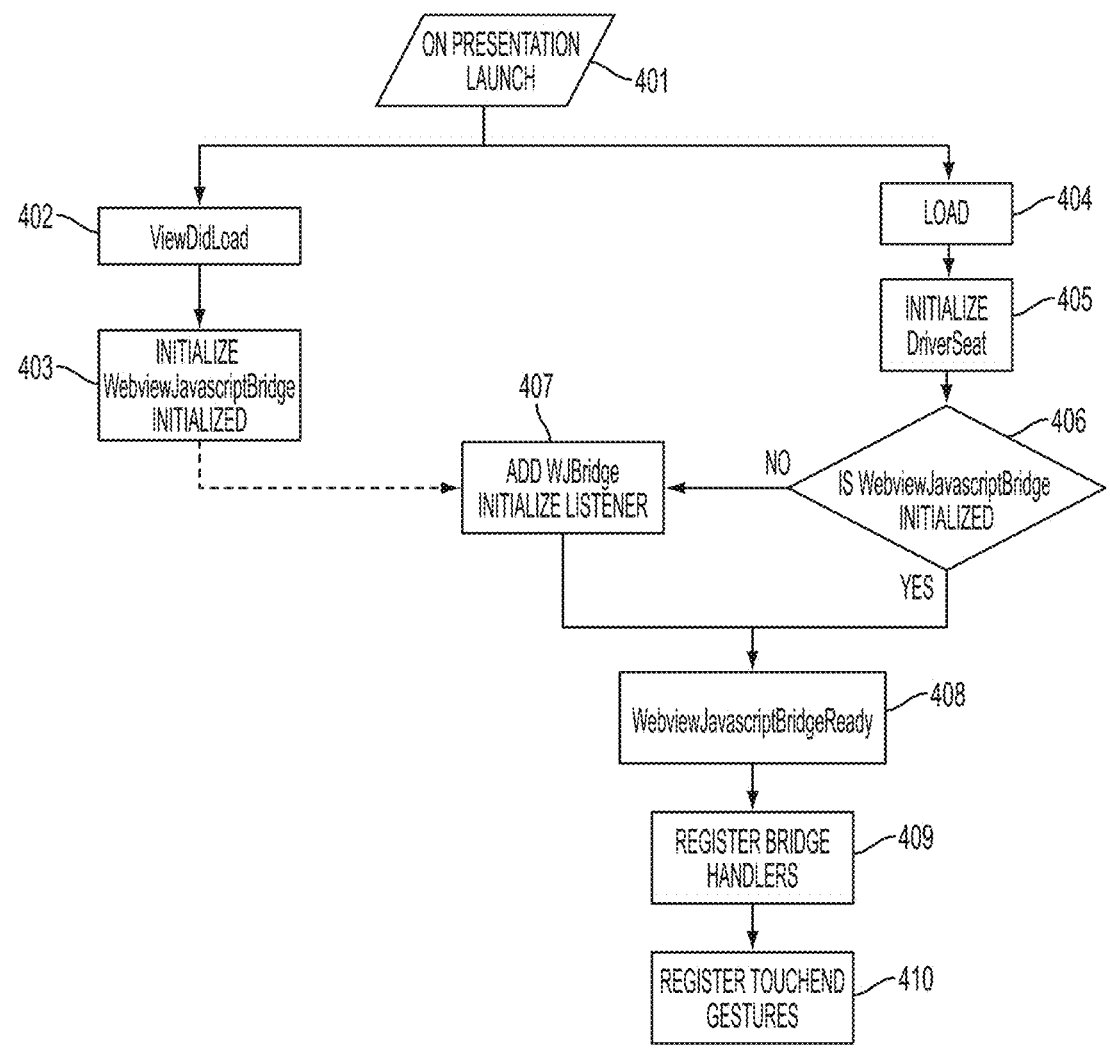
FIG. 7 shows a flow diagram of the WebviewJavascriptBridge Mirroring in accordance with an embodiment of the present invention.

Now referring to FIG. 7, the WebviewJavascriptBridge 14 Mirroring will be explained. WebViewJavascriptBridge 14 is an iOS bridge for sending messages between Obj-C and Javascript in iOS webcomponents (UIWebViews). Webviewjavascriptbridge is a module that uses webview, an IOS feature and javascript to develop an html presentation bridge—a tool that captures commands and passes to the layers. This bridge is used to pass the received event to JavaScript, and conversely any events executed in JavaScript to the native iOS layer 16.

The WebviewJavascriptBridge 14 is the layer that actually controls the mirroring display of the HTML and PDF presentations 4. On the other hand, the Native iOS layer 16 is responsible for communicating between the iPad devices 10, 12 so as to determine what data needs to be mirrored. As described earlier, specifically FIG. 1 depicts how the two mirroring components, Native iOS layer 16+WebviewJavascriptBridge 14 interact with one another.

In essence, the mirroring is established between the representative 6 and the HCP 8 by the step of the representative 6 launching the desired presentation 4, step 401. This results in the Native webview being loaded in step 402. This step is followed by initiation of the WebviewJavascriptBridge 14 in order to establish for efficient communication between Javascript and native iOS 403. At the same time, Javascript gets loaded as well 404, which initializes the DriiverSeat™ app 405. A check is executed to see whether or not WebViewJavascriptBridge 14 has been initialized or not 406. In case that it has not yet been initialized, the DriiverSeat™ app adds the listener 8 for WebViewJavascriptBridge initialization 406. However, on the other hand, if it has already been initialized, then the DriiverSeat™ app invokes the Web ViewJavascriptBridgeReady functionality 408. The DriiverSeat™ app then registers the handlers for the bridge 409, subsequently followed by registering the TouchEnd gestures for the presentation 4, step 410.

Google Analytics

Figure 8:
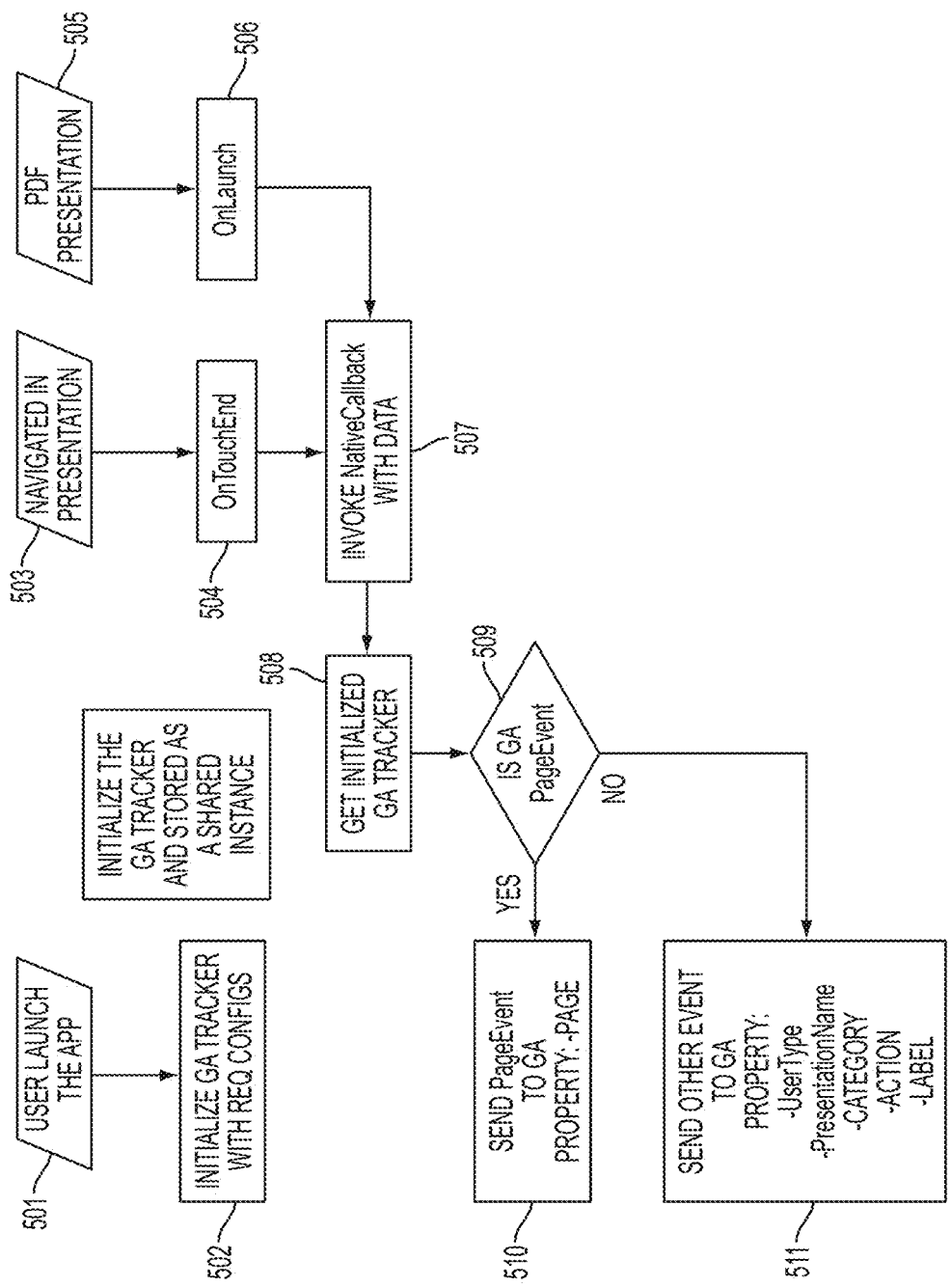
FIG. 8 shows a flow diagram of how Google Analytics is used to collect usage statistics for the presentations given by representative in accordance with an embodiment of the present invention. This same approach is used or may be used to capture and send analytics data to other software and/or data providers.

FIG. 8 depicts how Google Analytics is used to collect usage statistics for the presentations given by representative 6 purely for analysis purposes. Google Analytics is a Google framework that has been configured to send tracking data for each action within the presentation on an as needed basis. The data is captured offline, however an Internet connection is nevertheless required to transmit this data to Google. The data can then be viewed on the Google Analytics Dashboard web portal using valid login credentials.

A user starts by launching the DriiverSeat™ app 501, which is followed by initializing the Google Analytics tracker object with the Production/Demo key and the user sets the required basic configurations 502. When the user launches and navigates in the presentation 4 shown in step 503, the event OnTouchEnd feature is captured, step 504, and triggers Google Analytics events in the presentation 4, step 507. In case, it is a PDF presentation 4, the user launches the PDF presentation and the OnLaunch event is captured 506 in order to trigger the Google Analytics event. This invokes a native iOS native functionality 507 and the Google Analytics tracker gets initialized data from the shared instance 508. Then it is checked, whether it is a page event, or if it is another Google Analytics event 509. In case, it is a page event, the page event is sent to the Google Analytics 510. On the other hand, if it is not a page event, the normal event is sent to the Google Analytics with the required details 511. Data collected using Google Analytics SDK for iOS is stored locally before being dispatched on a separate thread to Google Analytics. Data must be dispatched and received by 4 a.m. of the following day in the local time-zone of each profile. Any data received later than that time-point will not appear in reports. For example, if a hit is queued locally at 11:59 pm, it must be dispatched within 4 hours, by 3:59 am in order to appear in reports. On the other hand, a hit queued at 12:00 am must be dispatched within 28 hours, i.e. 3:59 am of the following day in order to appear in reports.

Aside from the standard Google Analytics, dimensions such as Geography, Device Type etc., DriiverSeat™ also passes three custom dimension for aggregating the data: Presentation Name, Representative Team, and Representative versus HCP. With this final dimension it is possible to view exactly what information a representative is highlighting versus the information that HCP's are interested in.

Support Procedures and iPad Configuration

Figure 9A:
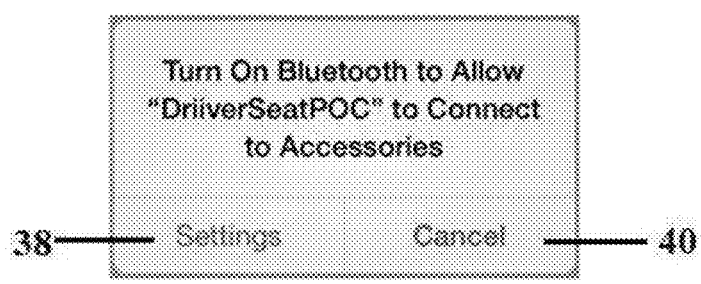
FIGS. 9A-9C show support procedures and iPad configuration DriiverSeat™ mobile application.
Figure 9B:
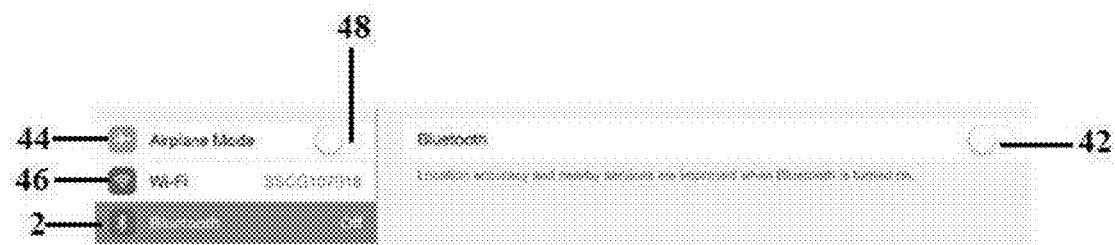
Figure 9C:

The basic support procedures and iPad configurations are illustrated more closely in FIGS. 9A-9C. Specifically, the features that can be manipulated are:

1) Turning Bluetooth ON
  A) If Bluetooth is on, no action is needed in this case from the user.
  B) If Bluetooth is not currently connected, the app will display a pop up asking for the user to turn on Bluetooth. When tapping of the "Setting" button 38 is executed by the user, the user is subsequently taken directly to the Bluetooth setting. The Bluetooth setting can then be turned on by the user via a gesture action of swiping the Bluetooth button 42 in a right direction. This is specifically depicted in FIG. 9C, wherein the Bluetooth has been activated by this specific gesture, as opposed FIG. 9B, which shows that the Bluetooth 2 is in an inactive state. The user also has the option of tapping the "cancel" 40 button as shown in FIG. 9A. In addition, features such as Airplane Mode 44 can also be activated by tapping the activation button 48 in a right direction as shown in FIGS. 9B-9C. Moreover, WiFi activation can also be executed via the use of button 46.

To return to DriiverSeat™, the user is taken through a gesture of clicking the device's home button and tapping on the DS icon or double tapping the home button and finding the "driivers seat" screen, than tapping on the DS screen in order to re-enter the active DriverSeat™ application.

2) Turning iPad Auto-Lock OFF

The user is directed into settings 38, general, auto-lock and selecting the "Never" functionality.

3) Locking Orientation to "landscape"

The user is asked to open control center via a swipe up gesture and then tap the icon to the far right, while the device is in the landscape mode.

4) Set the iPad Name/Names allow iPads 12 to be identified easily, such they can be paired quickly while on a call.
  1. On the device, the user is asked to tap Settings 38>General>About.
  2. Tapping the first line will display the name of the device.
  3. Renaming the device can be executed using the on-screen keyboard and tapping Done.

5) Setting a Password

To set up a pass-code for the iPad 10:
1. The user is directed to go to Settings 38.
2. The user will then enter the pass-code and tap Turn Pass-code On.

To change the pass-code or pass-code settings:
1. The user is asked to go to Settings 38, Pass-code.
2. On iOS 7.0.6 or earlier, the user is asked to look under Settings 38, General, for these settings.

Content Management System

Figure 10:
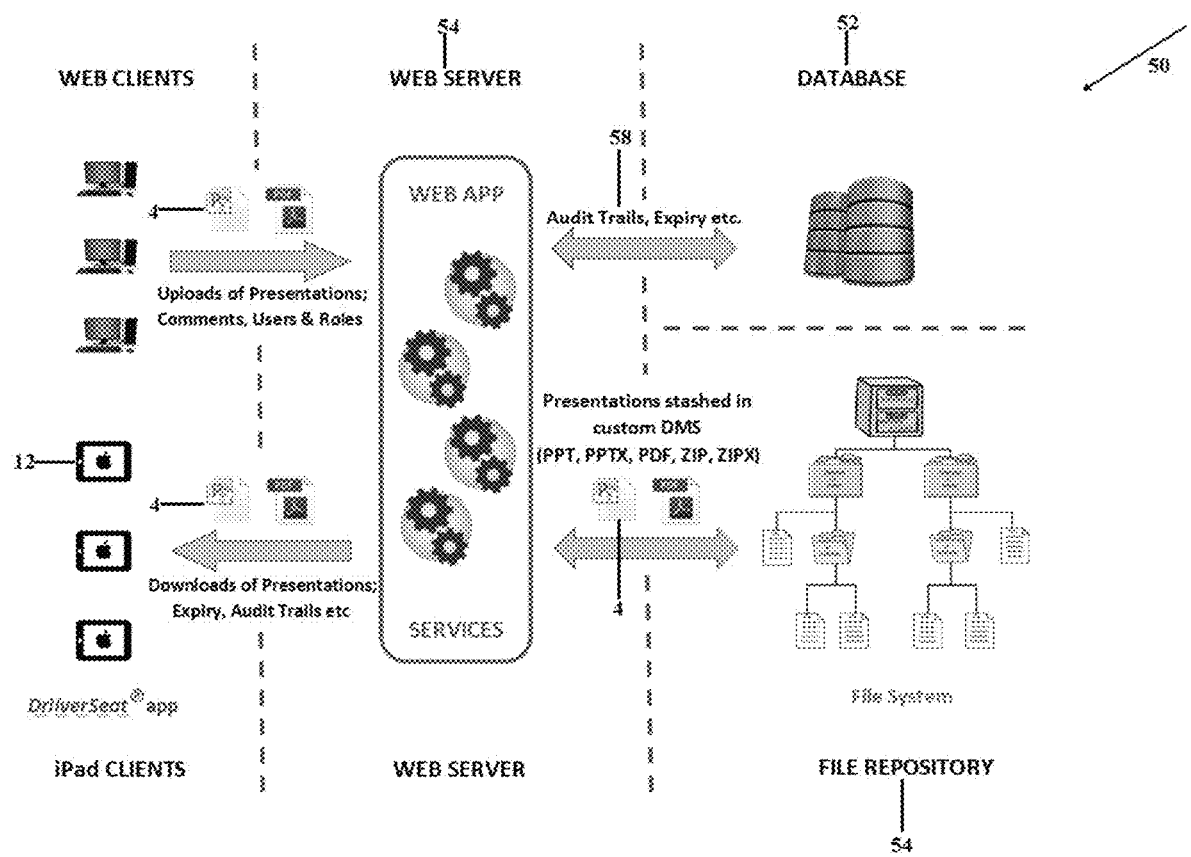
FIG. 10 is a diagram illustrating an example of a system that generates, manages, and presents content in accordance an embodiment of the present invention.

In a preferred embodiment, the DriiverSeat™ application may advantageously be integrated with a Content Management System (CMS) 50 as demonstrated in FIG. 10. Pharmaceutical or Marketing companies may upload approved presentations 4 so that Representatives will be able to download them to their iPad tablets 12. The CMS 50 may have the ability to define a publishing workflow with appropriate authorization, document expiration dates and comments, and more specifically, has a database 52 and a file repository system 54 conveniently using a webserver 56, which offers web app services, in order to ensure that the representatives 6 have the most up-to-date version of the presentations 4.

A publishing workflow will be provided and expiration dates 58 will be set for each presentation 4, so as to properly ensure healthcare regulatory compliances. In this embodiment, the presentations 4 are stored in a custom Document Management System (DMS), which can for example include such as but not limited to powerpoint and pdf presentations 4 or zip files or the like. The combination of the DMS plus the additional functionality provided comprises the overall CMS.

Additional Use Cases

Figure 11:
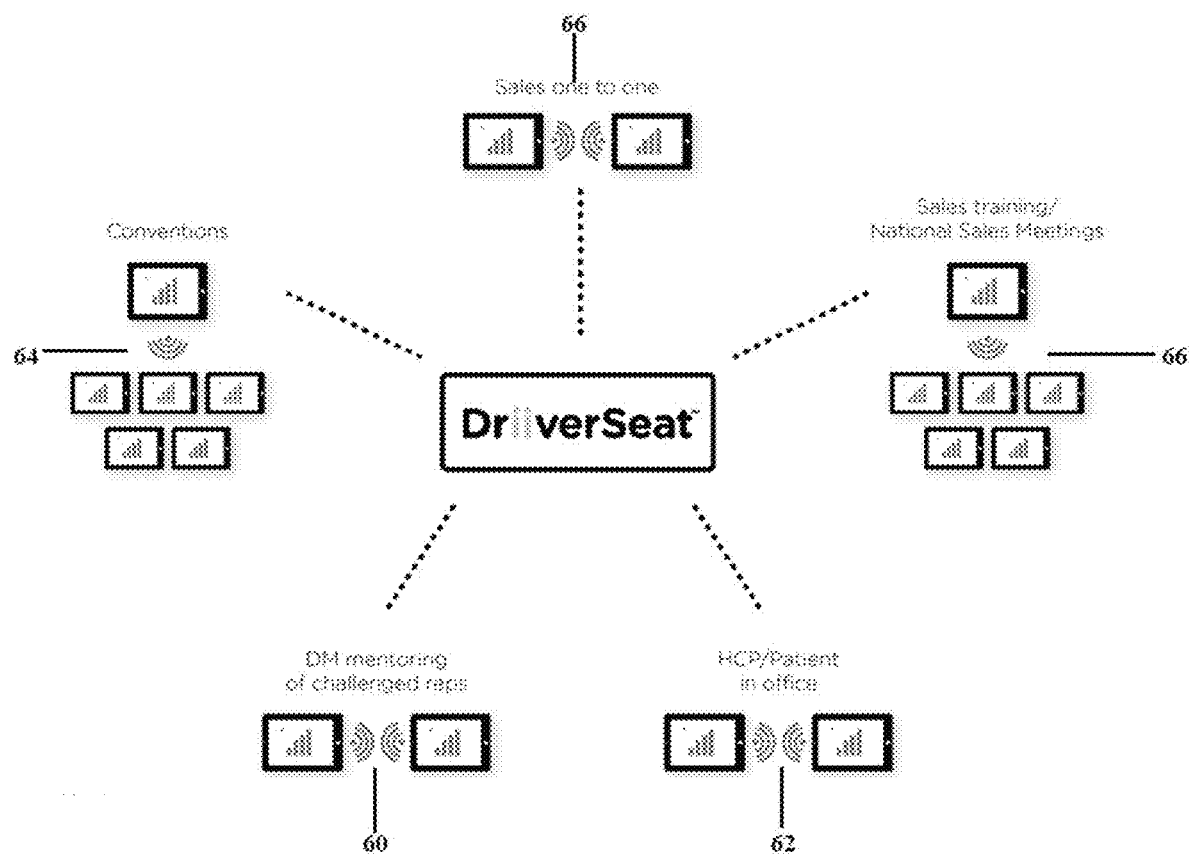
FIG. 11 is a diagram illustrating different applications of the system in accordance with an embodiments of the invention. In addition to the one-to-one Representative and HCP usage, the application may also be adapted to allow one Representative or Master connecting to multiple HCP or Listener devices. In that case there could be options such as having the Master designate a specific Listener device to have active co-navigation while the other Listener devices only have the ability to view.

In any of the embodiments set forth in this disclosure, core DriiverSeat™ capabilities will be leveraged to provide additional use case functionality as demonstrated in FIG. 11, such as but not limited to:
  Mentoring scenarios 60.
  HCP & Patient interactions 62.
  Convention usage 64.
  Training and Sales Meetings 66.

Embodiments of the present invention are particularly without exception suited for iPads or similar tablets. Computer readable medium containing computer readable instructions executable by a computer that when executed as resident software application on a portable device (e.g., iPad) carries out the steps comprising the software process as described herein. Execution of computer readable medium steps (stored on non-transient memory), or method steps on a single tablet configured to be capable to operate with another device are also contemplated.

To the extend methods, processes, or steps are described, it is understood that these are implemented or used to configure software, tablets, or computers for embodiments of the present invention, this can include storage in non-transient memory.

One advantage of the system or application is that it implements the co-navigation feature by way of a resident software application as opposed to using a browser based technology or communications through the Internet.

To clarify, the present description sometimes describes the operation of the system, method, or computer readable medium by providing a description of the operation or structure from the user's perspective. It is understood from the above description that the functionality and features of the application, systems, or methods of embodiments of the present invention include generating displays or sending signal to accomplish the actions.

It should be understood that variations, clarifications, or modifications are contemplated. Applications of the technology to other fields are also contemplated.

Unless defined otherwise, all technical and scientific terms used herein have the same meaning as commonly understood by one of ordinary skill in the art to which this invention belongs. Although any methods and materials similar or equivalent to those described herein can also be used in the practice of the present invention, exemplary methods and materials are described for illustrative purposes.

Further since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention.

Thus for example any sequence(s) and/or temporal order of steps of various processes or methods (or sequence of system connections or operation) that are described herein are illustrative and should not be interpreted as being restrictive. Accordingly, it should be understood that although steps of various processes or methods or connections or sequence of operations may be shown and described as being in a sequence or temporal order, but they are not necessary limited to being carried out in any particular sequence or order. For example, the steps in such processes or methods generally may be carried out in various different sequences and orders, while still falling within the scope of the present invention. Moreover, in some discussions, it would be evident to those of ordinary skill in the art that a subsequent action, process, or feature is in response to an earlier action, process, or feature.

Unless defined otherwise, all technical and scientific terms used herein this disclosure have same meaning as commonly understood by one of ordinary skill in the art to which this invention belongs. As used herein and in the appended claims, the singular form "a," "and," "the" include plural referents unless the context clearly dictates otherwise. All technical and scientific terms used herein have the same meaning.

Although the present invention has been described and illustrated herein with referred to preferred embodiments, it will be apparent to those of ordinary skill in the art that other embodiments may perform similar functions and/or achieve like results. Thus, it should be understood that various features and aspects of the disclosed of the disclosed embodiments can be combined with, or substituted for one another in order to form varying modes of the disclosed invention. Many different embodiments such as variations, adaptations, modifications, and equivalent arrangements are implicitly and explicitly disclosed by the embodiments described herein, and thus fall within the scope and spirit of the present invention, as long as all the desired inherent technical features and attributes are not lost.

It should be understood that claims that include fewer limitations, the broader claims, such as claims without requiring the presentation to be stored on each tablet, clarifications to the claim elements, different combination, alternative implementations based on the specification such as the use of WiFi, or different uses, are also contemplated by the embodiments of the present invention.

Thus, the scope of the embodiments of the present invention should be determined by the appended claims and their legal equivalents rather than by the Figures.

What is claimed is:

1. A content management and presentation system comprising:
   a first tablet loaded with a resident software application operating over an operating system of the first tablet, the first tablet allowing a first user to navigate a presentation;
   a second tablet loaded with the resident software application operating over an operating system of the second tablet, the second tablet allowing a second user to co-navigate the presentation; and
   wherein the resident software application of the first and second tablets includes a media viewer and a local asset container comprising a local storage filled with presentation files, the media viewer is configured to access and play the presentation files, and the resident software application of the first and second tablets is configured to:
   (i) establish a direct tablet-to-tablet communication connection between the resident software applications through a synchronization option of the resident software application;
   (ii) after the communication connection is established, communicate application-level synchronization data through the communication connection;
   (iii) retrieve a representative selected presentation, where a copy of the representative selected presentation is stored on each tablet and the representative selected presentation is retrieved from the local storage of each the two tablets when the representative selected presentation is selected, wherein in the representative selected presentation comprises a plurality of slides;
   (iv) after retrieval of the representative selected presentation, use data in two-way communications in a communication channel in the communication connection to synchronize and maintain displays on both tablets to be synchronized;
   (v) co-navigate during dual mirroring within the representative selected presentation on each tablet in response to interaction with the representative selected presentation on each tablet, such that each of the two tablet users can navigate within the representative selected presentation and views of the representative selected presentation remain synchronized;
   (vi) identify whether there is a navigation conflict by determining if the first and second user navigate to different areas in the presentation and resolve the conflict by determining which navigation move takes precedence and should be executed without effecting a navigation move for a conflicting navigation command selected by one of the users;
   (vii) receives the first user's navigation move on the first tablet, attaches a timestamp to the first user's navigation move, and transmits the first user's navigation move and the timestamp to the second tablet; and
   (viii) receives the second user's navigation move on the second tablet, attaches a timestamp to the second user's navigation move, and transmits the second user's navigation move, the timestamp of the second user's navigation move, and the timestamp of the first user's navigation move to the first tablet allowing the resident software application to determine whether the first tablet and the second tablet are in sync.

2. The system of claim 1, wherein the communications connection is established using Bluetooth.

3. The system of claim 1, wherein the resident software application is further configured to present pharmaceutical compliant presentations in an in-office environment to physicians or other health care providers.

4. The system of claim 1 wherein the resident software application is further configured to include software features that implement health care related regulation and to present pharmaceutical compliant presentations.

5. The system of claims 1 wherein the software application is further configured to include data privacy features.

6. The system of claim 1, wherein the resident software application identifies the navigation conflict by determining a time difference between the time a representative command is inputted and the time a HCP command is inputted, determining whether the time difference is less than a minimum threshold, and determining if a navigation conflict exits when the time difference is less than the minimum threshold.

7. A method comprising computer implemented software process steps for presenting a presentation, the steps comprising:
   establishing a direct tablet-to-tablet communication connection between a resident software application installed on a first tablet and the resident software application installed on a second tablet, wherein the resident software application of the first and second tablets includes a media view and a local asset container comprising a local storage filled with presentation files;
   communicating, after the communication connection is established, application-level synchronization data through the communication connection;
   retrieving a representative selected presentation, where a copy of the representative selected presentation is stored on each tablet and the representative selected presentation is retrieved from the local storage of each tablet when the representative selected presentation is selected, wherein in the representative selected presentation comprises a plurality of slides;
using, after retrieval of the representative selected presentation, data in two-way communications in a communication channel in the communication connection to synchronize and maintain displays on both tablets to be synchronized;
co-navigating during dual mirroring within the representative selected presentation on each tablet in response to interaction with the representative selected presentation on each tablet, such that each tablet user can navigate within the representative selected presentation and views of the representative selected presentation remain synchronized;
identifying whether there is a navigation conflict by determining if the first and second user navigate to different areas in the presentation and resolving the conflict by determining which navigation move takes precedence and should be executed without effecting a navigation move for a conflicting navigation command selected by one of the users;
receiving the first user's navigation move on the first tablet, attaching a timestamp to the first user's navigation move, and transmitting the first user's navigation move and the timestamp to the second tablet; and
receiving the second user's navigation move on the second tablet, attaching a timestamp to the second user's navigation move, and transmitting the second user's navigation move, the timestamp of the second user's navigation move, and the timestamp of the first user's navigation move to the first tablet allowing the resident software application to determine whether the first tablet and the second tablet are in sync.

8. The method of claim 7, wherein the step of establishing a direct tablet-to-tablet communication connection is through Bluetooth.

9. The method of claim 7, further comprising presenting pharmaceutical compliant presentations in an in-office environment to physicians or other health care providers.

10. The method of claim 7, further comprising implementing health care related regulation and presenting pharmaceutical compliant presentations.

11. The method of claim 7, further comprising implementing data privacy features.

12. The method of claim 7, further comprising identifying the navigation conflict by determining a time difference between the time a representative command is inputted and the time a HCP command is inputted, determining whether the time difference is less than a minimum threshold, and determining if a navigation conflict exits when the time difference is less than the minimum threshold.

13. A non-transient computer readable medium containing computer readable instructions executable by a computer that when executed as part of resident software application on a tablet, the tablet carries out steps comprising:
establishing a direct tablet-to-tablet communication connection between a resident software application installed on a first tablet and the resident software application installed on a second tablet, wherein and the resident software application of the first and second tablets includes a media view and a local asset container comprising a local storage filled with presentation files;
communicating, after the communication connection is established, application-level synchronization data through the communication connection;
retrieving a representative selected presentation, where a copy of the representative selected presentation is stored on each tablet and the representative selected presentation is retrieved from the local storage of each tablet when the representative selected presentation is selected, wherein in the representative selected presentation comprises a plurality of slides;
using, after retrieval of the representative selected presentation, data in two-way communications in a communication channel to synchronize and maintain displays on both tablets to be synchronized;
co-navigating during dual mirroring within the representative selected presentation on each tablet in response to interaction with the representative selected presentation on each tablet, such that each tablet user can navigate within the representative selected presentation and views of the representative selected presentation remain synchronized;
identifying whether there is a navigation conflict by determining if the first and second user navigate to different areas in the presentation and resolving the conflict by determining which navigation move takes precedence and should be executed without effecting a navigation move for a conflicting navigation command selected by one of the users;
receiving the first user's navigation move on the first tablet, attaching a timestamp to the first user's navigation move, and transmitting the first user's navigation move and the timestamp to the second tablet; and
receiving the second user's navigation move on the second tablet, attaching a timestamp to the second user's navigation move, and transmitting the second user's navigation move, the timestamp of the second user's navigation move, and the timestamp of the first user's navigation move to the first tablet allowing the resident software application to determine whether the first tablet and the second tablet are in sync.

14. The computer readable medium of claim 13, wherein the step of establishing a direct tablet-to-tablet communication connection is through Bluetooth.

15. The computer readable medium of claim 13, further comprising presenting pharmaceutical compliant presentations in an in-office environment to physicians or other health care providers.

16. The computer readable medium of claim 13, further comprising implementing health care related regulation and presenting pharmaceutical compliant presentations.

17. The computer readable medium of claim 13, wherein the resident software application identifies the navigation conflict by determining a time difference between the time a representative command is inputted and the time a HCP command is inputted, determining whether the time difference is less than a minimum threshold, and determining if a navigation conflict exits when the time difference is less than the minimum threshold.

18. The system of claim 1 wherein the resident application is configured to provide the ability to configure the application so "Presenter" or Representatives and "Listener" or HCP's may annotate presentations to improve Representative-HCP interactions; and provides the ability for the "Presenter" or Representative to turn-off co-navigation if needed to ensure that they are able to cover the materials with the "Listener" or HCP without interruption.

19. The system of claim 1, wherein the representative selected presentation includes analytics tags configured to track tablet user's activities within the representative selected presentation and to be sent to an analytics software provider.

20. The system of claim 1, wherein the resident software application identifies the navigation conflict by determining a time difference between the time a representative command is inputted and the time a HCP command is inputted.

21. The method of claim 7, wherein the representative selected presentation includes analytics tags configured to track tablet user's activities within the representative selected presentation and to be sent to an analytics software provider.

22. The method of claim 7, further comprising identifying the navigation conflict by determining a time difference between the time a representative command is inputted and the time a HCP command is inputted.

23. The computer readable medium of claim 13, wherein the representative selected presentation includes analytics tags configured to track tablet user's activities within the representative selected presentation and to be sent to an analytics software provider.

24. The computer readable medium of claim 13, wherein the resident software application identifies the navigation conflict by determining a time difference between the time a representative command is inputted and the time a HCP command is inputted.

* * * * *